United States Patent [19]
Hardy et al.

[11] Patent Number: 4,648,044
[45] Date of Patent: Mar. 3, 1987

[54] BASIC EXPERT SYSTEM TOOL

[75] Inventors: Steven Hardy, Palo Alto; Robert H. Joyce, San Jose, both of Calif.

[73] Assignee: Teknowledge, Inc., Palo Alto, Calif.

[21] Appl. No.: 617,791

[22] Filed: Jun. 6, 1984

[51] Int. Cl.⁴ ............................................. G06F 15/18
[52] U.S. Cl. ................................... 364/513; 364/300; 364/900
[58] Field of Search ............... 364/130, 148, 300, 400, 364/513, 200 MS File, 900 MS File; 382/14, 15

[56] References Cited

U.S. PATENT DOCUMENTS

| | | | |
|---|---|---|---|
| 3,697,957 | 10/1972 | Barron | 364/148 |
| 3,716,840 | 2/1973 | Masten et al. | 364/200 |
| 4,286,330 | 8/1981 | Isaacson | 364/300 X |
| 4,326,259 | 4/1982 | Cooper et al. | 364/900 X |
| 4,368,509 | 1/1983 | Li | 364/149 X |
| 4,479,176 | 10/1984 | Grimshaw | 364/152 X |

OTHER PUBLICATIONS

Clarke & McCabe, "Prolog: A Language for Implementing Expert Systems", Dept. of Computing, Imperial College, London (1980).
Clocksin & Mellish, *Programming in Prolog*, Springer-Verlag, New York, N.Y. (1981).
Van Melle et al., "The Emycin Manual," Dept. of Computer Science, Stanford University, Stanford, CA (1981).
Peter Hammond, "Logic Programming for Expert Systems," Tech. Rep. Doc 82/4, Dept. of Computing, Imperial College, London (1982).
Steven Hardy, "Towards More Natural Programming Languages," Cognitive Studies Program, Univ. of Sussex, Falmer, England (1982).
Marek Sergot, "A Query-The-User Facility for Logic Programming," Research Rep. Doc 82/18, Dept. of Computing, Imperial College, London (1982).
Cohen & Feigenbaum, *The Handbook of Artificial Intelligence*, vol. III, William Kaufmann, Inc., Los Altos, CA (1982) pp. 120–123.
Peter Hammond, "APES: A User Manual," Dept. of Computing Report No.: 82/9, Imperial College, London (1983).
Sloman, et al., "Poplog: A Multilanguage Program Development Environment," *Information Technology: Research and Development*, No. 2 (1983) pp. 109, 122.
"8086 Prolog-1 Reference Manual," Issue 2, Expert Systems Ltd., 9 West Way, Oxford, England (1983).

*Primary Examiner*—Joseph Ruggiero
*Attorney, Agent, or Firm*—Leydig, Voit & Mayer

[57] ABSTRACT

A tool for building a knowledge system and running a consultation on a computer is easily mastered by people with little computer experience yet also provides advanced capabilities for the experienced knowledge engineer. The knowledge system includes a knowledge base in an easily understood English-like language expressing facts, rules, and meta-facts for specifying how the rules are to be applied to solve a specific problem. The tool includes interactive knowledge base debugging, question generation, legal response checking, explanation, certainty factors, and the use of variables. The knowledge base language permits recursion and is extensible. Preferably, control during a consultation is goal directed in depth-first fashion as specified by rule order. The tool is easily embodied in assembly language, or in PROLOG to allow user-defined PROLOG functions.

40 Claims, 28 Drawing Figures

CACHE (EXPRESSION, VALUE, CF, REASON)

| | | | |
|---|---|---|---|
| main-component | poultry | 100 | yousaidso |
| has-turkey | yes | 100 | yousaidso |
| has-sauce | yes | 100 | yousaidso |
| sauce | sweet | 100 | yousaidso |
| best-color | red | 80 | rule 28 |
| best-color | white | 50 | rule 28 |
| recommended-color | red | 80 | rule 27 |
| recommended-color | white | 60 | rule 27 and rule 29 |
| preferred-color | white | 100 | yousaidso |
| | | | |
| | | | |
| | | | |
| | | | |

4,648,044

BASIC EXPERT SYSTEM TOOL

FIELD OF THE INVENTION

The present invention relates generally to artificial intelligence and knowledge engineering, and more particularly to a knowledge engineering tool.

BACKGROUND OF THE INVENTION

Knowledge systems are computer systems that emulate reasoning tasks by using an "inference engine" to interpret encoded knowledge of human experts stored in a "knowledge base." If the domain of the knowledge base, or scope of the problem, is sufficiently narrow and a sufficiently large body of the knowledge is properly coded in the knowledge base, then the knowledge system can achieve performance matching or exceeding the ability of a human expert. In such a case the knowledge system becomes an "expert system."

The most difficult step in building expert systems involves encoding unstructured, often even unarticulated, knowledge into machine readable form. The encoding process is performed by a "knowledge engineer" who must be adept at both the milking of knowledge from a human expert and the encoding of the knowledge into the machine readable expert system language. The ease of the encoding step is dependent on the particular syntax, intelligibility, and capabilities of the expert system language itself, as well as the availability of "knowledge engineering tools" used by the knowledge engineer to test, debug, augment and modify the knowledge base. Due to the lack of knowledge engineering tools based on a transparent expert system language, a person needs a good deal of formal education in computer science as well as specialized training in knowledge engineering to become a skilled knowledge engineer. To build an expert system it is far easier for the knowledge engineer to become a pseudo-expert in the knowledge domain of the human expert than it is for the human expert to learn knowledge engineering and directly encode his or her knowledge into machine readable form.

Another factor limiting the implementation of expert systems is that only a relatively small number of engineers and managers are aware of knowledge systems, so that the number of systems conceived and undertaken is far smaller than it might be. Moreover, after a system is conceived, a small prototype system is desired to demonstrate that a knowledge system would actually be useful in a given context. Currently, some prototyping can be done with well known knowledge engineering tools such as MRS and EMYCIN. Commercial versions of these tools, such as KS300 sold by Teknowledge, Inc. 525 University Avenue, Palo Alto, California 94301, are written in a dialect of LISP and require a rather large computer. The EMYCIN language itself also has a few undesirable limitations such as the inability to handle recursive rules and universally quantified variables.

SUMMARY OF THE INVENTION

The basic object of the invention is to provide a useful knowledge engineering tool for building an expert system and running a consultation on a personal-type microcomputer that is easily mastered by people with little computer experience yet also provides advanced capabilities for the experienced knowledge engineer.

Another object of the invention is to provide a low-cost knowledge engineering tool for the rapid determination of the applicability of knowledge engineering technology to a specific problem domain and rapid prototyping of potential full-scale operational expert systems.

Still another object of the invention is to provide a transparent and easily understood expert system language that supports certainty factors, recursion, symbolic or universally quantified variables, and is extensible.

And yet another object of the invention is to provide a basic expert system tool for a personal-type microcomputer that permits the knowledge engineer to write and add PROLOG subroutines to the knowledge base.

Briefly, in accordance with the invention, a basic tool is provided for building an expert system and running a consultation on a personal-type microcomputer that is easily mastered by people with little computer experience, yet also has advanced capabilities for the experienced knowledge engineer. The basic expert system tool includes a knowledge base in an easily understood English-like language expressing facts, rules, and "meta-facts" which specify how the facts and rules are to be applied to solve a specific problem. The tool includes interactive knowledge base debugging, question generation, legal response checking, explanation, certainty factors, and the use of variables. The knowledge base language permits recursion and is extensible. Preferably, control during a consultation is goal directed in depth-first fashion as specified by rule order unless otherwise specified by the knowledge engineer. The basic expert system tool (hereinafter abbreviated BEST) is easily embodied in assembly language, or in PROLOG to allow user-defined PROLOG functions.

BRIEF DESCRIPTION OF THE DRAWINGS

Other objects and advantages of the invention will become apparent upon reading the following detailed description and upon reference to the drawings in which.

Figure 1:
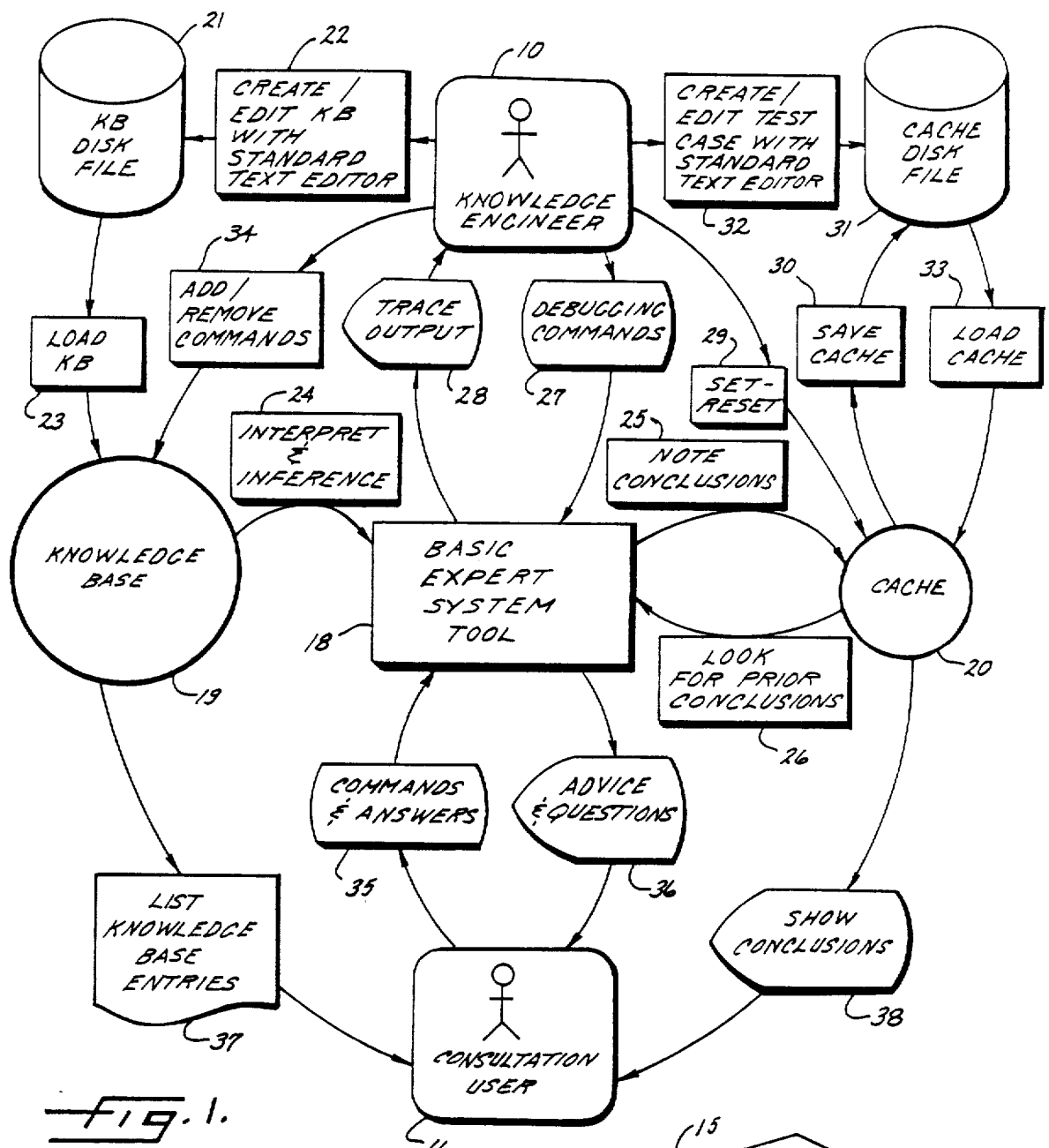
FIG. 1 is a block diagram of the Basic Expert System Tool (BEST) according to the invention.

While the invention is susceptable to various modifications and alternative forms, a specific embodiment thereof has been shown by way of example in the drawings and will herein be described in detail. It should be understood, however, that it is not intended to limit the invention to the particular form disclosed, but on the contrary, the intention is to cover all modifications, equivalents, and alternatives falling within the spirit and scope of the invention as defined by the appended claims.

DESCRIPTION OF A PREFERRED EMBODIMENT

Figure 2:
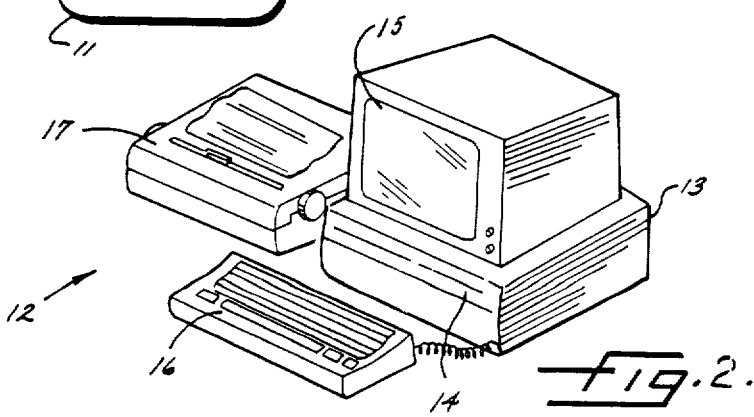
FIG. 2 is a pictorial diagram of a personal-type microcomputer on which BEST is run.

Turning now to the drawings, there is shown in FIG. 1 a functional block diagram of the preferred embodiment of the Basic Expert System Tool (BEST) residing in a personal-type microcomputer shown in FIG. 2 and interacting with either a knowledge engineer 10 or a consultation user 11. The personal computer generally designated 12 is of conventional construction and has a central unit 13 including a microprocessor and random access memory along with one or more floppy disk drives for receiving computer programs and data to be executed and processed by the microcomputer. To run a program, for example, a floppy disk is inserted in a slot 14 in the front of the main unit 13. In order for the user to interact with the microcomputer 12 when a program is being run, the microcomputer includes a cathode ray tube display 15 for showing the user intermediate results and prompting the user for data to be entered via a keyboard 16. To provide a permanent record or listing of data when a computer program is run, a printer 17 is also provided.

The present invention concerns the use of the microcomputer 12 to design and implement a knowledge system to solve a particular problem. For this purpose, the microcomputer 12 executes a Basic Expert System Tool software module or computer program 18. During execution, the BEST software module 18 resides in the random access memory of the microcomputer 12 and further reserves a portion of random access memory 19 to receive a knowledge base including knowledge about how to solve the particular problem, and a portion of memory 20 called the cache for noting the intermediate results of a consultation.

The Basic Expert System Tool functions in either a building mode or a consultation mode. In the building mode, the knowledge engineer 10 first creates a knowledge base disk file 21 by using a standard text editor program 22. At this time the BEST software module 18 need not be loaded into the random access memory of the microcomputer 12. Once a sufficiently large knowledge base is created in the knowledge base disk file 21, the knowledge engineer 10 tests the knowledge base by loading (23) the knowledge base disk file into the knowledge base random access memory 19. The knowledge engineer 10 then uses BEST 18 to run a test consultation. During the test consultation the knowledge engineer 10 specifies goals for BEST to solve by interpreting (24) facts in the knowledge base 19 and by applying rules of inference in the knowledge base. During the test consultation, conclusions are noted (25) in the cache 20 and BEST looks for prior conclusions (26) in cache.

So that the knowledge engineer 10 may observe the individual steps and internal workings of BEST during the test consultation, debugging commands 27 are entered by the knowledge engineer to expose the internal workings of BEST during the test consultation. BEST generates trace output 28 giving a record or history of precisely how BEST is interpreting the knowledge base 19. Also, the knowledge engineer 10 can stop the test consultation at any given point to change the dynamic state of the consultation being stored in the cache 20. The knowledge engineer can set or reset the cache 20 to any dynamic state. Also, the knowledge enqineer 10 can save or transfer (30) the entire contents of the cache 20 to a cache disk file 31 for extensive observation, editing, or to suspend a test consultation at an intermediate point for any length of time. The cache disk file 31 is edited or inspected (32) using a standard text editor. The knowledge engineer 10 can resume the test consultation by loading (33) the cache disk file 31 to the cache random access memory 20. By following this debugging process, the knowledge engineer may discover that minor changes are required in the knowledge base 19. BEST is provided with add/remove commands 34 to permit the knowledge engineer 10 to quickly make minor changes in the knowledge base 19. Once these minor changes are checked out using the debugging commands 27 during a test consultation, the knowledge engineer 10 may enter them into the knowledge base disk file 21 using the standard text editor (22).

In summary, the knowledge engineer 10 creates the knowledge base file and then debugs it with the facilities available in BEST. The knowledge engineer writes facts and rules into the knowledge base disk file 21 with the standard text editor 22. When loaded into BEST, the disk file becomes the knowledge base that BEST accesses whenever it needs information. As BEST pursues a test consultation, the engineer traces the flow of inferences and conclusions BEST makes from the knowledge base and stores in the cache 20. Additional commands allow the knowledge engineer to add or remove entries from the loaded knowledge base, run a test consultation to find the values of goal expressions, set and reset the dynamic state of the consultation in the cache, and continue with the consultation.

During the consultation mode of the Basic Expert System Tool, the consultation user consults (35) with BEST 18 and receives advice (36) on a specific subject. BEST asks the user questions as it makes inferences based on the contents of the loaded knowledge base 19. The user then supplies the required information or in turn asks BEST to reveal why a particular piece of information is needed. The user is free to list (37) knowledge base entries related to a particular aspect of the consultation, as well as to show (38) the current conclusions BEST 18 has noted in the cache 20.

Figure 3:
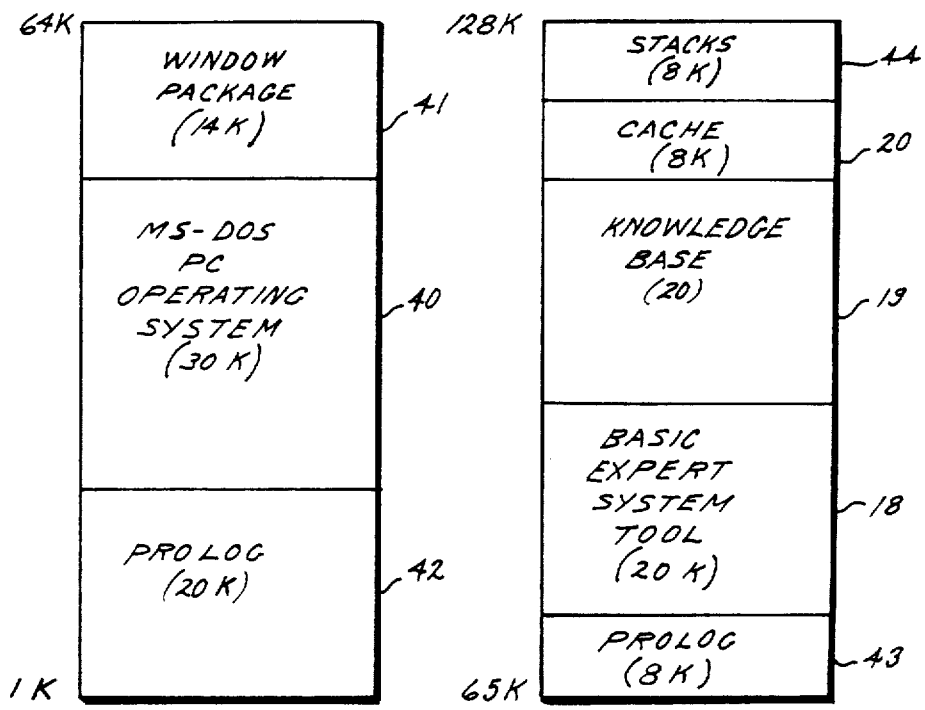
FIG. 3 is a typical memory map for the microcomputer of FIG. 2 when a PROLOG version of BEST is run on the microcomputer.

In a specific embodiment of the BEST as shown in FIG. 1, the microcomputer 12 is an IBM (International Business Machines, Inc.) "personal computer" having 128 kilobytes of random access memory. This random access memory is configured as shown in FIG. 3 when the BEST module 18 is loaded and executed. The loading of the disk files 21, 31 as well as the BEST module 18 is performed by the operating system of the microcomputer 12. For the IBM personal computer, the operating system comprises 30 kilobytes of memory (40) containing the standard "MS-DOS" operating system. BEST may use a 14 kilobyte window package (41) for formating information on the display 15 (FIG. 2) in a particularly attractive fashion. According to the known technique of windowing, multiple listings of data are displayed simultaneously. This is useful for displaying a consultation listing (as shown in Appendix VIII to this specification) on one side of the display 15 and the rules currently under consideration on the other side of the display.

In the specific embodiment shown in FIG. 3, the BEST module 18 is written in a high level programming language called PROLOG. It is easy to implement BEST in PROLOG, since searching, matching of expressions, and instantiating variables are inherent PROLOG operations. In FIG. 3, the inherent PROLOG operations are performed by a PROLOG module 42 residing in 20 kilobytes of random access memory. Also, the PROLOG module 42 uses 8 kilobytes of memory 43 at higher addresses. Since the PROLOG module 42 is used in conjunction with the BEST module 18, BEST is provided with capabilities to allow the user to define his or her own PROLOG functions. Thus, the more experienced knowledge engineer can extend BEST to suit his particular needs by adding user-defined PROLOG subroutines.

During execution of the BEST module 18, random access memory in addition to the cache 20 is needed to store intermediate results. These additional intermediate results are stored in stacks 44 at the upper most 8 kilobytes of memory. In particular, these stacks store pointers for searching the knowledge base 19 for particular expressions, parameters of subroutines that are called recursively, and tables of bound variables and their bindings.

The specific embodiment shown in FIG. 3 uses an 8086 PROLOG-1 dialect manufactured and sold by Expert Systems Limited, 9 Westway, Oxford, OX2 OJB, ENGLAND. The PROLOG language is generally described in the text *Programming In Prolog*, by W. F. Clocksin & C. S. Mellish, Springer Verlag Inc., New York, New York (1981). A reader familiar with the intricacies of PROLOG will understand that the preferred embodiment of the Basic Expert System Tool further described below advantageously incorporates the inherent feature of PROLOG. For the benefit of the reader who is not familiar with PROLOG, however, the following description will not presume any knowledge of PROLOG on the reader's part, and will show how the Basic Expert System Tool may be programmed in any desired language including assembly language. An assembly language version, for example, would be preferred for small microcomputers that cannot support the PROLOG language.

The language with which the Basic Expert System Tool is written is of some significance. But the language in which the knowledge base is written—the "expert system language"—is the most important factor determining the utility of the Basic Expert System Tool. This is due to the fact that the knowledge engineer 10 does most of his or her work in the expert system language. A knowledge engineer, for example, can use BEST as soon as he or she understands the expert system language regardless of whether he or she understands the language in which BEST is written.

The expert system language of BEST is illustrated by the exemplary "Wine Advisor" knowledge base listed in Appendix VII to the present specification.

For the sake of illustration, an abbreviation of the Wine Advisor knowledge base is reprinted below:

```
goal = [wine].
color = red.
question(preferred-body) =
   'Do you prefer light, medium, or full bodied wine?'.
legalvals(preferred-body) = [light, medium, full].
rule1: if preferred-body = full
   then recommended-body = full.
rule2: if color = red and recommended-body = full
   then wine = burgundy.
```

It should be observed that the knowledge base consists of a list of knowledge base entries in the form of EXPRESSION = VALUE. The knowledge base entries are delimited or separated from each other by a period at the end of each knowledge base entry. The first knowledge base entry declares a list of goals for a consultation. For the Wine Advisor the goal is to determine a kind of wine. The second knowledge base entry is a fact stating that the expression "color" has a value "red". The third knowledge base entry declares a question for the expression "preferred-body". The fourth knowledge base entry declares a list of legal values for the expression "preferred-body". The fifth knowledge base entry is a rule declaring that if the expression "preferred-body" has a value "full", then the expression "recommended-body" has a value "full". The sixth and final knowledge base entry is a rule declaring that if the expression "color" has a value "red" and the expression "recommended-body" has a value "full", then the expression "wine" has a value "burgundy".

With the above knowledge base, a consultation proceeds as follows. For each goal in the goal list of the first knowledge base entry, BEST searches for the value of the goal. In this particular case, the expression "wine" is the single goal. BEST searches starting at the top of the knowledge base for the expression "wine". BEST finds the expression "wine" in the first knowledge base entry. This first knowledge base entry, however, does not declare a value for the expression "wine". Thus, searching continues downwardly through the knowledge base for the expression "wine". BEST finds the expression "wine" in the final knowledge base entry, and BEST recognizes that this final knowledge base entry is in the form of a rule which concludes a value for the expression "wine". Thus, BEST applies Rule 2.

To apply Rule 2, BEST evaluates the premise of the rule, which requires the testing of whether the expression "color" has the value "red", and whether the expression "recommended-body" has the value "full". First, BEST searches for a knowledge base entry having the expression "color". BEST finds that the second knowledge base entry declares the expression "color" to have a value "red". Thus, the first conjunctive term of the premise of Rule 2 is satisfied. Next, BEST searches for the expression "recommended-body" in order to determine its value. BEST searches the knowledge base and finds that the expression "recommended-body" is in the conclusion of the fifth knowledge base entry, or Rule 1. This process of recursively evaluating rules in an attempt to test the premise of a rule is called "back-chaining." BEST applies Rule 1 and searches for the value of the expression "preferred-body" in the premise of Rule 1. BEST finds that the expression "preferred-body" is included in a question in the third knowledge base entry.

In response to this question declaration, the user is asked the question "Do you prefer light, medium, or full bodied wines?". After the user responds, presumably with the answer "full", BEST checks to see whether there is a legal values declaration for the expression "preferred-body". BEST finds that there is indeed a legal values declaration for this expression, and the list of legal values includes the value "full". Thus, the user's answer is checked to determine whether it is included in the list of legal values. If it was not included, the user would be told to select one of the legal values or to answer with the value "unknown". Since the user has responded with the value "full", the premise of Rule 1 is satisfied thereby assigning the value "full" to the expression "recommended-body". Consequently, the second conjunctive term in the premise of Rule 2 is satisfied, making the premise of Rule 2 true. Hence, Rule 2 finds a value for the goal "wine" equal to "burgundy". BEST concludes the Wine Advisor consultation by stating that "BEST has reached the following conclusions about wine: wine=burgundy (100%) because rule 2." The value 100% denotes that BEST is certain in its conclusion as to the value "burgundy" for the goal "wine".

From this simplified example, it is seen that BEST reasons about symbolic expressions that denote aspects of some situations such as the characteristics of a problem, its cause or its solution. BEST's reasoning is controlled by the list of goals and the order of the facts, rules, and "meta-facts" or declarations such as questions about the problem domain. BEST's basic operation is to find or cumulate evidence for the value of expressions.

The terms "expression" and "value" are entirely general and denote merely a delimited character string in the knowledge base. The only distinguishing feature between an "expression" and "value" is the fact that values become associated with expressions during BEST's interpretation of a knowledge base. Expressions in the BEST language need not have just one value, nor does a value have to be certain. Typically, there will be evidence for several competing values. When reasoning with certain knowledge, however, BEST behaves as an advanced symbolic programming language. BEST can also justify the value it has found for some expression and, during a consultation, explain its current line of reasoning. This transparency, combined with BEST's ability to perform symbolic reasoning with uncertain or incomplete knowledge, makes BEST an ideal tool for building expert systems which mimic a human consultant.

Figure 4:
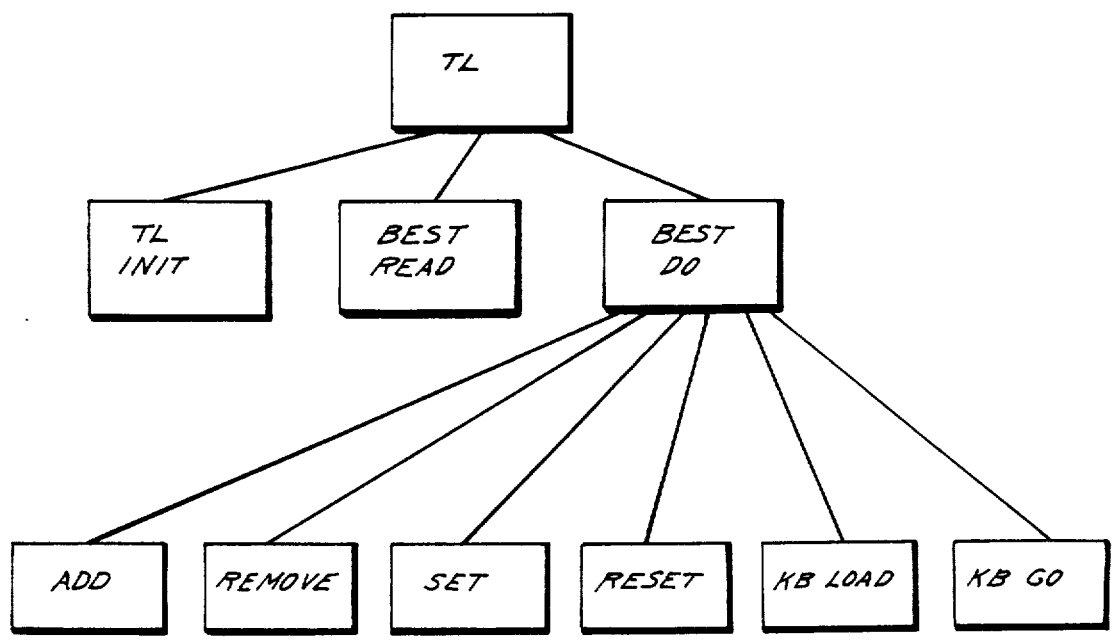
FIG. 4 is a hierarchical diagram of the toplevel modules or subroutines for BEST.

Turning now to FIG. 4 there is shown a hierarchical schematic diagram of the top level software modules or subroutines comprising BEST. Execution starts with a top level module (TL). The top level module calls an initialization module (TL INIT) to initialize the PROLOG module (42 in FIG. 3). Once initialized, the top level module (TL) calls a module (BEST READ) to read in the BEST module 18. Then, the top level module (TL) invokes an execution subroutine (BEST DO) to execute the BEST module 18. When the execution module (BEST DO) is executed, the user is given a top level prompt consisting of a question mark followed by a hyphen, and the system will respond to a set of top level commands that are for convenience listed in Appendix II appended to the specification. These top level commands cause the execution module (BEST DO) to execute one or more of a number of modules including (ADD), (REMOVE), (SET), (RESET), (KBLOAD), and (KBGO). The (ADD) module permits the knowledge engineer 10 to add knowledge base entries to the knowledge base 19 (FIG. 1). The subroutine (REMOVE) enables the knowledge engineer 10 to remove entries from the knowledge base 19. The subroutine (SET) permits the knowledge engineer 10 to set the cache 20 so that any desired expression will have a desired value. Conversely, a subroutine (RESET) is provided to reset the cache 20 to remove desired expressions from the cache 20. A subroutine (KBLOAD) is provided to load the knowledge base from the knowledge base disk file 21 to random access memory 19. In response to the top level command "go" the execution subroutine (BEST DO) calls the subroutine (KBLOAD) and then calls a knowledge base execution subroutine (KBGO).

Figure 5:
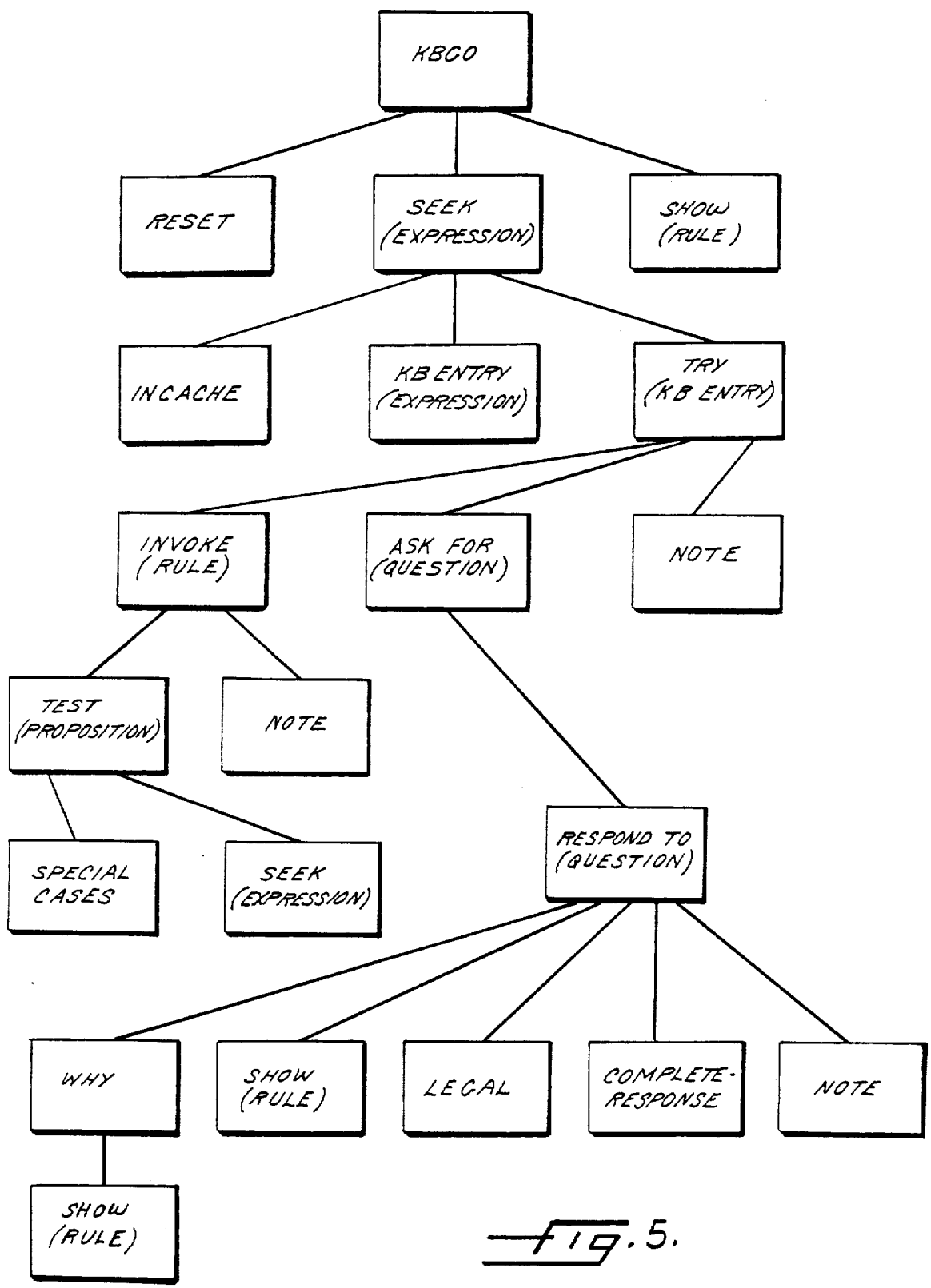
FIG. 5 is a hierarchical diagram of the lower level modules or subroutines for BEST.

Turning now to FIG. 5 there is shown a hierarchical schematic diagram of the knowledge base execution subroutine (KBGO) which interprets the knowledge base 19 to conduct a consultation. The subroutine (RESET) is called to clear the entire the cache 20. Then, for each goal expression, a subroutine (SEEK) is called to find the value for the goal expression and a subroutine (SHOW) is called to display the rule or reason which established the value of the goal expression. The subroutine (SEEK) which finds the value for any given expression first calls a subroutine (INCACHE) to determine whether the cache 20 already has been set to the values of the desired expression. If the cache does not include the desired expression, then the knowledge base 19 is searched for knowledge base entries including the desired expression. For each entry including the desired expression, a subroutine (TRY) is called in an attempt to determine the value of the expression from the knowledge base entry.

If the knowledge base entry is in the form of a rule having the expression in its conclusion, a subroutine (INVOKE) is called to apply the rule. A subroutine (TEST) is called to evaluate the premise of the rule. Subroutines (SPECIAL CASES) are called to apply particular rules for logical operations in the premise until the premise is broken down into individual expressions which are evaluated by recursively calling the subroutine (SEEK) which evaluates expressions. If the premise clause of a rule is satisfied, then a subroutine (NOTE) is called to record in the cache the values of the concluded expression.

If the knowledge base entry being tried is in the form of a question for the expression, and the value of the expression is unknown, then a subroutine (ASK FOR) is called to ask the user the question. A subroutine (RESPOND TO) is called to check the user response. If the response of the user is "why", a subroutine (WHY) is called which gives an explanation or calls a subroutine (SHOW) to show the rule which is causing the question to be asked. All of the current rules being applied are shown in response to a user response "show".

If the user response is neither "why" or "show", a subroutine (LEGAL) searches the knowledge base for a legal values declaration for the expression. If such a legal values declaration is found, the legal values are obtained and a subroutine (COMPLETE-RESPONSE) is called in an attempt to match the user's response with one of the legal values. If the response matches the beginning of only a particular one of the legal values, then the user response is completed by replacing it with the matching legal response. Otherwise, if there is no unambiguous partial match, the user is shown the legal values and is requested to respond with a legal value or answer with "unknown" or request further information by responding "why". When a legal value is obtained, the subroutine (NOTE) is called to record the expression and its value. Also, the user may alway append a "certainty factor" to his or her response. The certainty factor indicates the extent to which the user believes the value to be true. A certainty factor greater than 80%, for example, indicates substantial certainty in the value and a certainty factor of less than 20% indicates that the value is unknown. The certainty factor may range from 0 to 100% with a value of 50% indicating that there is some evidence for the expression having the corresponding value. Any certainty factor received from the user is stored along with the value received for the expression. If a certainty factor is not supplied, it is assumed to be 100%. The value, in other words, is then presumed to be known with certainty. The threshold numbers of 20% and 80% are somewhat arbitrary since the certainty factor need not be a precise measure of the probability of the value being true.

Figure 6:
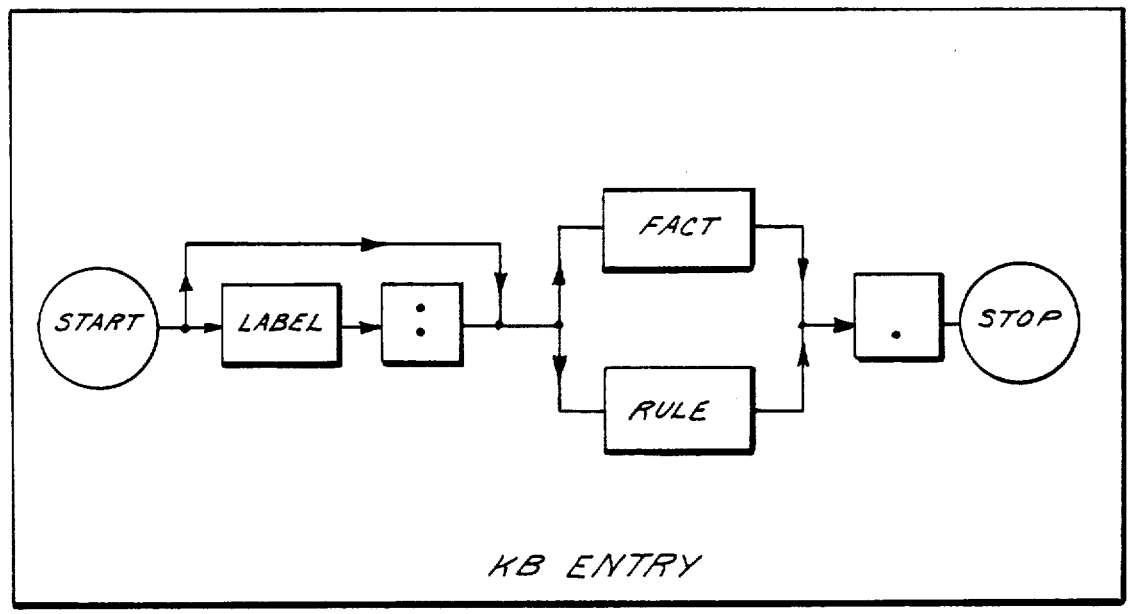
FIG. 6 is a flow chart showing the knowledge base entry syntax for the BEST language.

In order for BEST to interpret the knowledge base, it is evident that the knowledge must be encoded according to a rather precise format. This syntax is diagramatically illustrated in FIGS. 6–13. The major subdivision of the knowledge base is a KNOWLEDGE BASE ENTRY shown in FIG. 6. Any knowledge base entry may have an optional LABEL identified by a postfix colon. The body of each knowledge base entry is called a FACT. Each knowledge base entry is terminated or delimited by a period. A RULE is a particular kind of fact that is conditioned by a premise.

Figure 7:
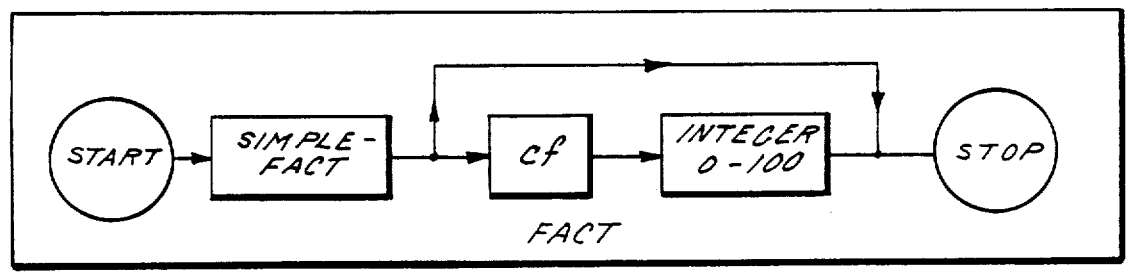
FIG. 7 is a flow chart showing the BEST language syntax for a fact.

Turning to FIG. 7 there is shown a flow chart for the entry of a FACT. A fact always includes a SIMPLE-FACT. Optionally, the simple-fact may be post-fixed by the operation "cf" followed by an integer number ranging from 0 to 100 denoting the percentage certainty factor with which the simple-fact is being declared.

Figure 8:
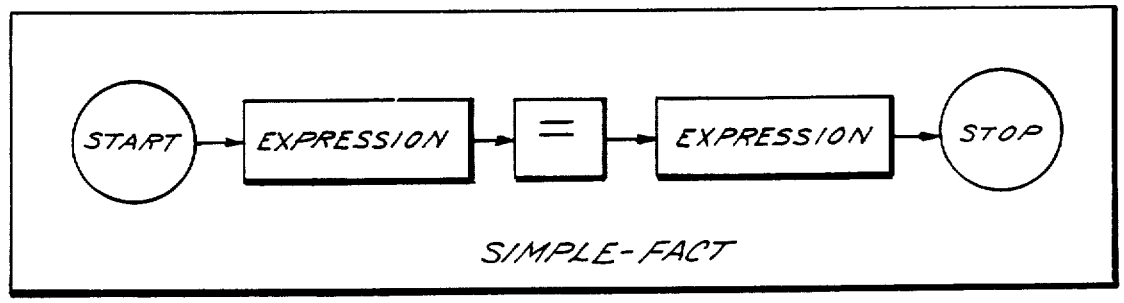
FIG. 8 is a flow chart showing the BEST language syntax for a simple-fact.

Turning to FIG. 8 there are shown the components of a SIMPLE-FACT. The simple-fact is in the form of one EXPRESSION followed by the operator "=" and terminated by another EXPRESSION which is the declared value of the first expression.

Figure 9:
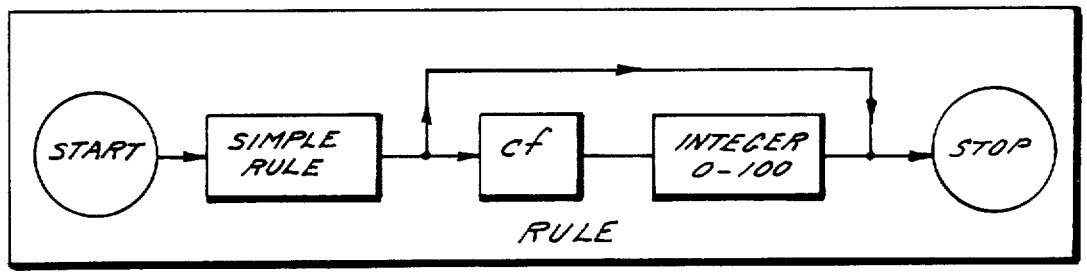
FIG. 9 is a flow chart showing the BEST language syntax for a rule.

Turning now to FIG. 9, there is shown the format for a RULE. A rule always includes a SIMPLE-RULE followed by an optional certainty factor.

Figure 10:
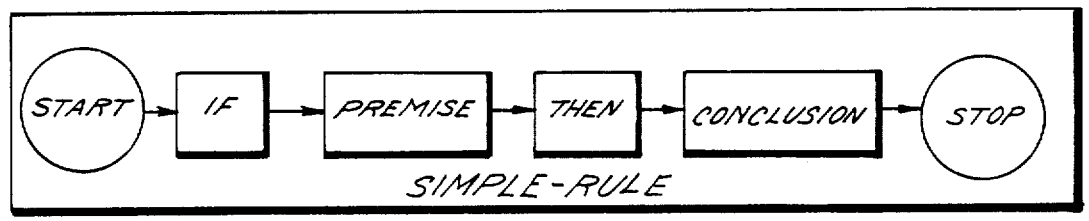
FIG. 10 is a flow chart of the BEST language syntax for a simple-rule.

Turning to FIG. 10 there is shown the format for a SIMPLE-RULE. The simple-rule is identified by the operator "if" followed by an expression called a "PREMISE" which is in turn followed by an operator "then" and the simple-rule is terminated by a particular kind of expression called a CONCLUSION.

Figure 11:
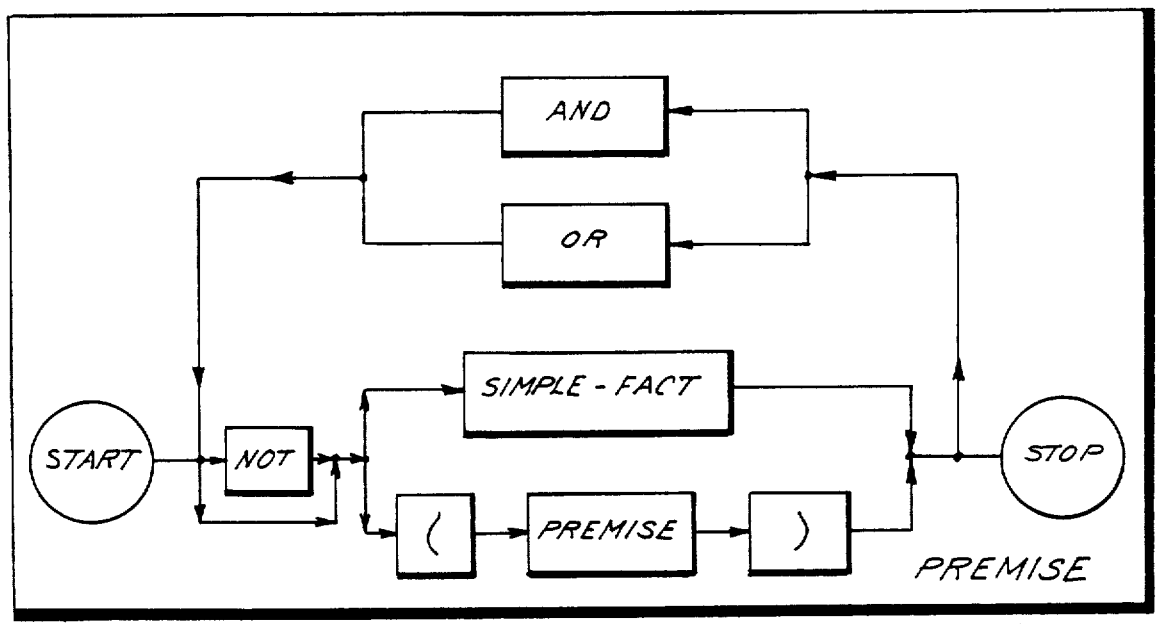
FIG. 11 is a flow chart showing the BEST language syntax for a rule premise.

The format for a PREMISE is shown in FIG. 11. The premise always includes at least one SIMPLE-FACT. More than one simple-fact may be joined by the logical infix operator "or" or "and", and each simple fact may be preceded by the logical prefix operator "not". Moreover, complex premises may be built up using left and right parentheses to specify the order of evaluation of the logical operators.

Figure 12:
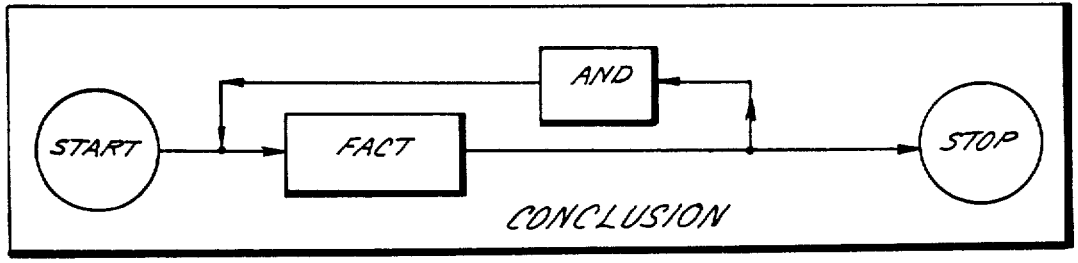
FIG. 12 is a flow chart showing the BEST language syntax for a rule conclusion.

In FIG. 12 it is shown that a CONCLUSION is merely a conjunction FACT's.

Figure 13:
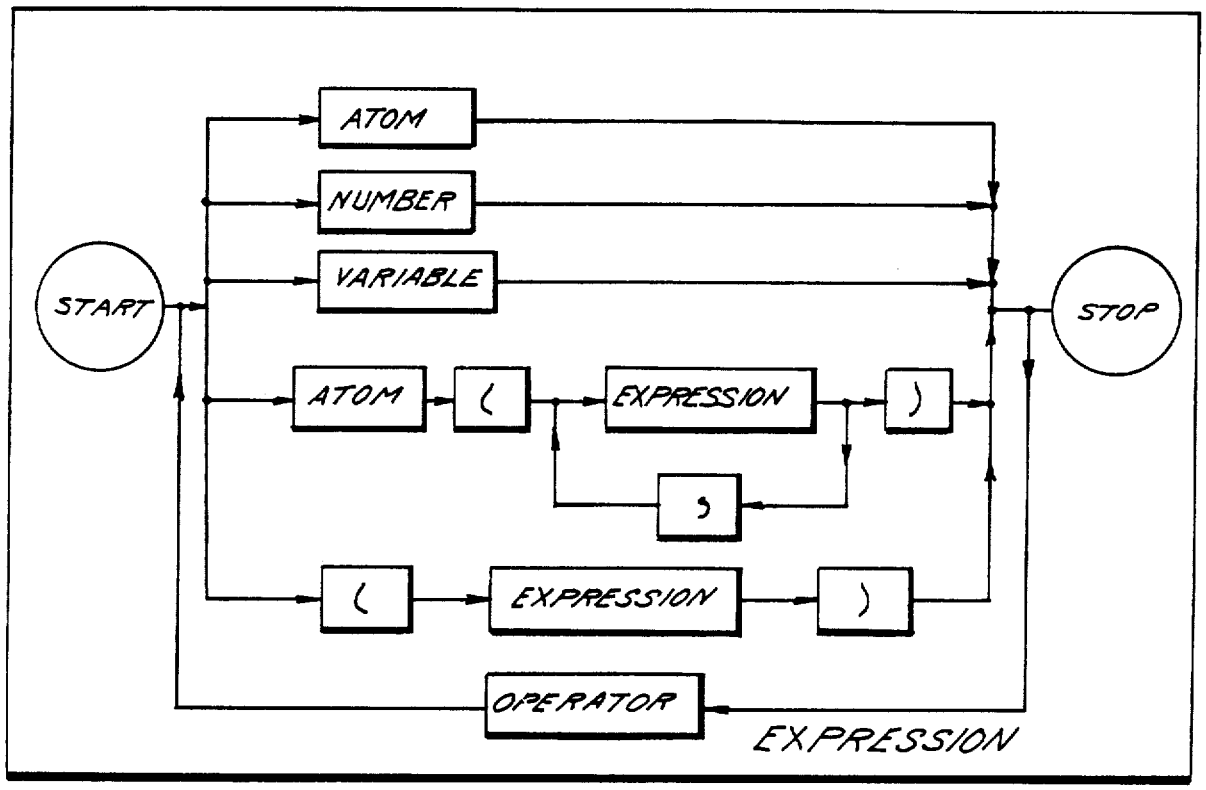
FIG. 13 is a flow chart showing the BEST language syntax, for an arbitrary expression.

Turning to FIG. 13 it is seen that an EXPRESSION is merely any combination of delimited character strings. The smallest delimited character string is either an "ATOM", a "NUMBER", a "VARIABLE", or an "OPERATOR". These character strings are delimited by characters such as a blank, left parentheses, right parentheses, quote, left bracket, right bracket, etc. An atom is a delimited character string starting with a small alphabetic letter. Atoms, for example, represent discrete objects or ideas. A number is a delimited character string starting with a digit. A number, for example, is an integer consisting of a string of digits. A variable is a delimited character string starting with a capital alphabetic letter.

A variable can be instantiated or bound to an arbitrary expression. The VARIABLE-EXPRESSION relationship is distinguished from the EXPRESSION-VALUE relationship due to the fact that a variable may be bound and unbound to different expressions while a value becomes permanently bound or attached to an expression. Variables are used in rules so that the rules have universal applicability to more than one object. For the Wine Advisor, a default rule for determining the value of the atom "recommended-body" could be as follows:

```
rule3: if preferred-body = X
       then recommended-body = X.
```

Thus, presuming that the legal values of "preferred-body" are "light", "medium", and "full", Rule 3 states three rules, one for the variable X being bound to each of the legal values. It should be noted that the character string "preferred-body" is an atom because the hyphen is not interpreted as a delimiter character unless the hyphen is followed by a variable. (The atom preceding the hyphen becomes a function in this case, as described below in conjunction with Appendix X to the specification.) Specifically, the hyphen performs the function of an "atom bond" to improve the legibility of facts and rules.

An OPERATOR is defined as a character string which is given special significance during the evaluation of an expression in terms of the bindings of the variables in the expression and the values of the atoms and numbers in the expression. Certain operators are in the form of atoms and are distinguished from atoms only as certain predefined character strings called reserved words. A list of such reserved words are given in Appendix VI along with other operators. During the seeking of value for an expression, the BEST interpreter searches for operators in the expression. When an operator is found, BEST applies predefined rules constituting the definition of the operator upon the expression in order to simplify or break down the expression into the bindings and values of its component variables, numbers, and atoms. One advantage of implementing BEST in a hiqher level language such as PROLOG is that the higher level language has already set up a mechanism for decomposing expressions into the component parts and evaluating standard operators in the expression.

The interpretation of the knowledge base is performed by matching the "templates" of FIGS. 6–13 against the character string comprising the knowledge base. Before this matching is attempted, multiple blanks and comments in the knowledge base disk file are deleted. A comment in the knowledge base disk file is identified by the left delimiter "/*" and the right delimiter "*/". The basic operation, then, is finding a predetermined character string in the knowledge base.

Figure 14:
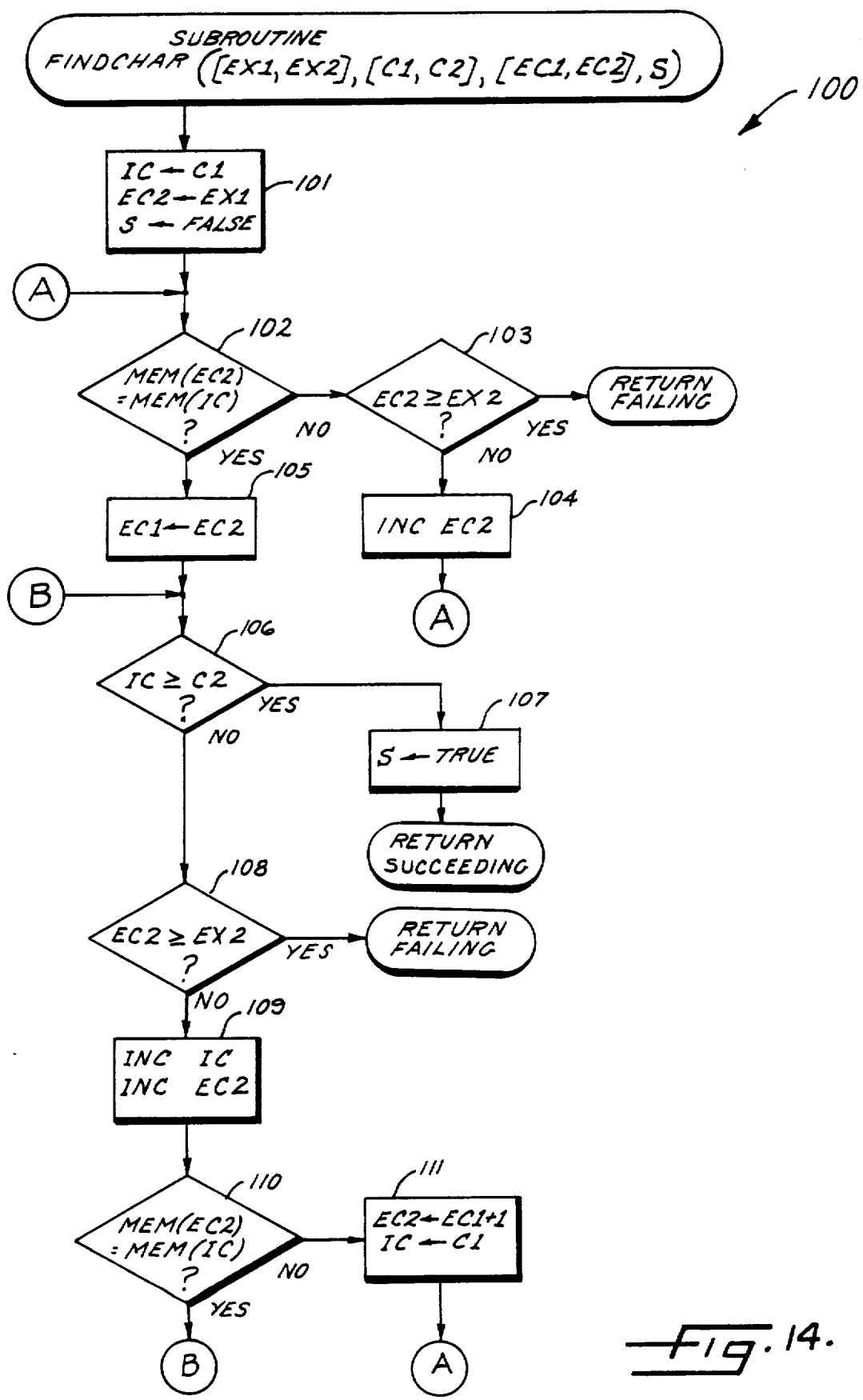
FIG. 14 is a flow chart of an assembly language subroutine for finding a desired character string in the knowledge base.

For the reader unfamiliar with PROLOG, a typical assembly language program for finding a predetermined character string is shown in FIG. 14. The knowledge base is an expression having lower and higher memory addresses EX1 and EX2, respectively. The character string is defined by low and high addresses C1, C2, respectively, in another part of memory. The result of the subroutine (FINDCHAR) is the character string found in the knowledge base at low and high addresses designated EC1, EC2, respectively. Another return parameter is a logical flag S indicating whether the search was successful (S=true), or unsuccessful (S=false).

The FINDCHAR subroutine generally designated 100 starts with an initialization step 101 wherein a character string pointer IC is set to the low character address C1, and the high return parameter EC2, used as a pointer to the knowledge base, is set equal to the low address of the knowledge base EX1. The logical flag S is initially set equal to false. In step 102 the first character in the knowledge base is compared to the first character in the character string. If the characters do not match, and if there are remaining characters in the knowledge base as tested in step 103, then the knowledge base pointer EC2 is incremented in step 104 so that the next character in the knowledge base is compared to the first character in the character string C1, C2.

Once step 102 indicates a match, the initial match is marked in step 105 by setting the low return address EC1 to the value of the knowledge base pointer EC2. In step 106 the character string pointer IC is compared to the high character string address C2 to determine whether the entire character string has been matched. If so, then in step 107 the logical flag S is set true and execution returns successfully to the calling program.

Otherwise, in step 108 the knowledge base pointer is compared to the high knowledge base address to determine whether the entire knowledge base has been scanned. If so, the FINDCHAR subroutine has failed and execution returns to the calling programs. Otherwise in step 109 the character string pointer IC and the knowledge base pointer EC2 are both incremented in order to compare the next character in the character string to the next character in the knowledge base. This comparison is performed in step 110 and if it is successful, execution returns to step 106 to test whether the entire character string has been matched. Otherwise, the match has failed, and in step 111 the knowledge base pointer EC2 must be set back to the next character after the initial match at the knowledge base position having been marked in step 105. Also, the character string pointer IC must be set back to the first character and execution returns to step 102 to test for another initial match.

Figure 15:
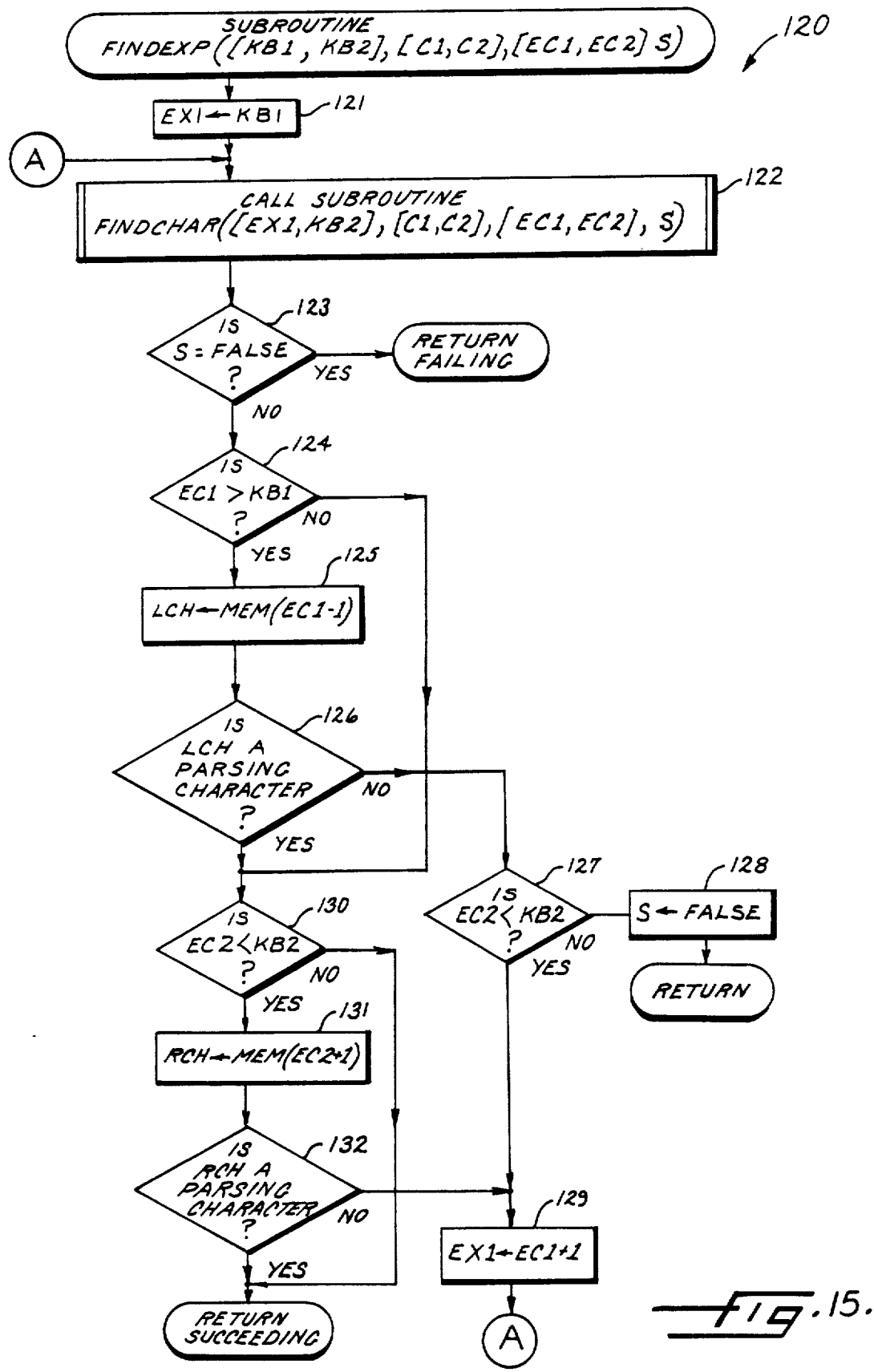
FIG. 15 is a flow chart of a subroutine for finding a desired expression in the knowledge base.

Turning now to FIG. 15 there is shown a FINDEXP subroutine to find a predetermined expression in the knowledge base. An expression is distinguished from an arbitrary character string in that the expression must be preceeded and followed by either a delimiter character or the beginning or end of the knowledge base. It is presumed that the low address of the knowledge base is KB1 and the high address of the knowledge base is KB2. The low and high address of the predetermined expression are C1 and C2, respectively. The return parameters are EC1, EC2, and the logical flag S as previously defined. The first step in the FINDEXP subroutine generally designated 120 is step 121 wherein the parameter EX1 is set to the low address KB1 of the knowledge base. Then in step 122 the FINDCHAR subroutine of FIG. 14 is called to search for the expression character string in the knowledge base. In step 123 the logical flag S is tested to determine whether a match was found and, if not, the expression is not in the knowledge base, the FINDEXP subroutine has failed, and execution returns to the calling program. Otherwise in step 124 the low address of EC1 the character string in the knowledge base is compared to the low address KB1 of the knowledge base to determine whether the string is at the beginning of the knowledge base. If the string is not at the beginning of the knowledge base, then the character LCH at the left of the character string is obtained in step 125 at the memory address of one less than the low address of the character string. In step 126 this character LCH is compared to each character in the predetermined set of parsing characters and if LCH is not a parsing character, then the initial match was incorrect. If the upper string address EC2 is not less than the upper address of the knowledge base KB2, as tested in step 127, then searching in the knowledge base cannot continue, and logical flag S is set false in step 128, and execution returns to the calling program. Otherwise, in step 129, the initial search pointer EX1 is set to one plus the lower string address in the knowledge base EC1 and execution returns to step 122 to continue searching.

If in step 126 the character LCH was a parsing character, then the upper or right most end of the character string in the knowledge base must be tested to determine whether it is either at the top of the knowledge base or delimited by a parsing character. In step 130 the upper address LEC2 of the string in the knowledge base EC2 is compared to the upper address of the knowledge base. If the string address is not less than the knowledge base address then the expression has been found in the knowledge base and execution returns. Otherwise, in step 131, the character RCH to the right of the string in the knowledge base is taken from memory at an address of one plus the upper address of the character string. In step 132 this character RCH is compared to each character in the set of parsing characters. If RCH is not a parsing character, then searching through the knowledge base must continue and execution jumps to step 129. Otherwise, the expression has been successfully found in the knowledge base and execution returns to the calling program.

Figure 16:
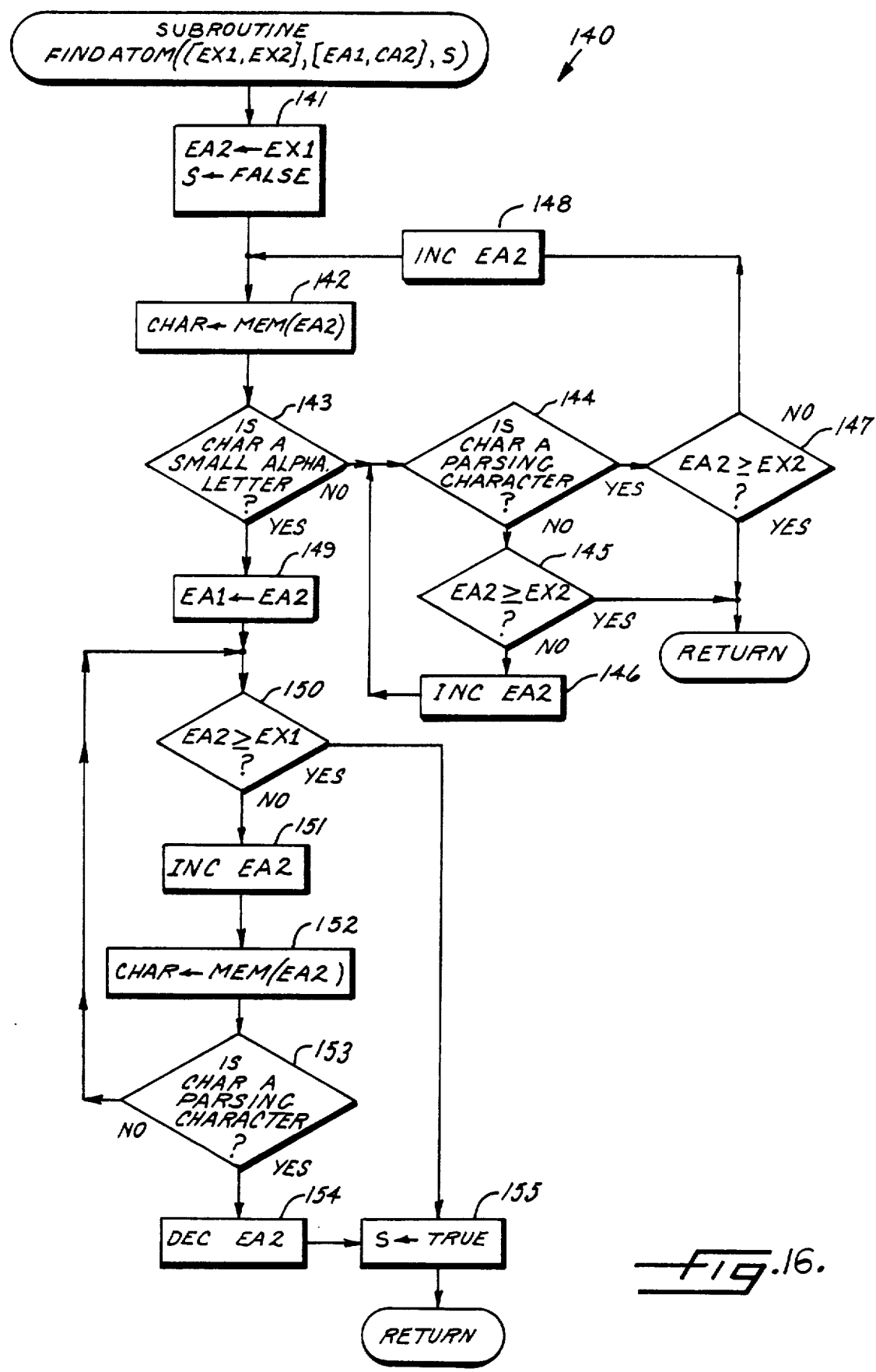
FIG. 16 is a subroutine for finding an atom in the knowledge base.

Turning now to FIG. 16 there is shown a subroutine for finding an atom in the knowledge base. The knowledge base is searched starting at a low address EX1 and terminating at a high address EX2. The beginning and ending address of the first atom found in the knowledge base is returned by the parameters EA1 and EA2, respectively. The logical variable S is also returned to indicate whether an atom was found. The FINDATOM subroutine generally designated 140 starts with step 141 wherein the return address EA2, which is also used as a pointer, is initially set to the low starting address EX1 and the logical flag S is set false. In step 142 the character in memory at the pointer EA2 is found and in step 143 it is compared to the range of values for small alphabetic letters.

If the character is not a small alphabetic letter, then in step 144 the character is compared to the predetermined set of parsing characters. If the character is not a parsing character, then in step 145 the pointer EA2 is compared to the maximum address EX2 to determine whether there are more characters in the knowledge base to search. If there are not any more characters in the knowledge base to search, the search for an atom has failed and execution returns to the calling program. Otherwise, in step 146 the pointer EA2 is incremented to continue searching for an initial parsing character.

Once a parsing character is found in step 144, then in step 147 the pointer EA2 is compared to the maximum address EX2 to determine whether there are more characters to search. If not, the search for an atom has failed and execution returns to the calling program. Otherwise, the pointer EA2 is incremented in step 148 and execution jumps back to step 142 in an attempt to find a small alphabetic letter.

If in step 143 the character is found to be a small alphabetic letter, then the start of the atom is marked in step 149 by setting the low return parameter address EA1 to the current value of the pointer EA2. In step 150 the pointer EA2 is compared to the high string address EX2 to determine whether the upper end of the character string has been reached. If not, the pointer EA2 is incremented in step 151 and the character in memory specified by the pointer EA2 is obtained in step 152. In step 153, this character is compared to a parsing character. If it is a parsing character, then the upper or right most character of the atom has been determined. Before returning, however, the pointer EA2 must be restored to the last character in the atom by decrementing the pointer in step 154. If, however, the pointer EA2 is at the upper end of the string, as determined in step 150, then the pointer EA2 need not be adjusted. Finally, in step 155, the logical flag S is set true and execution returns to the calling subroutine.

Similar subroutines for finding a variable and finding a number are virtually identical to the FINDATOM subroutine 140 in FIG. 16. For a subroutine to find a variable, step 143 tests whether the character is a capital alphabetic letter. To find a number step 143 checks whether the character is a decimal digit.

Figure 17:
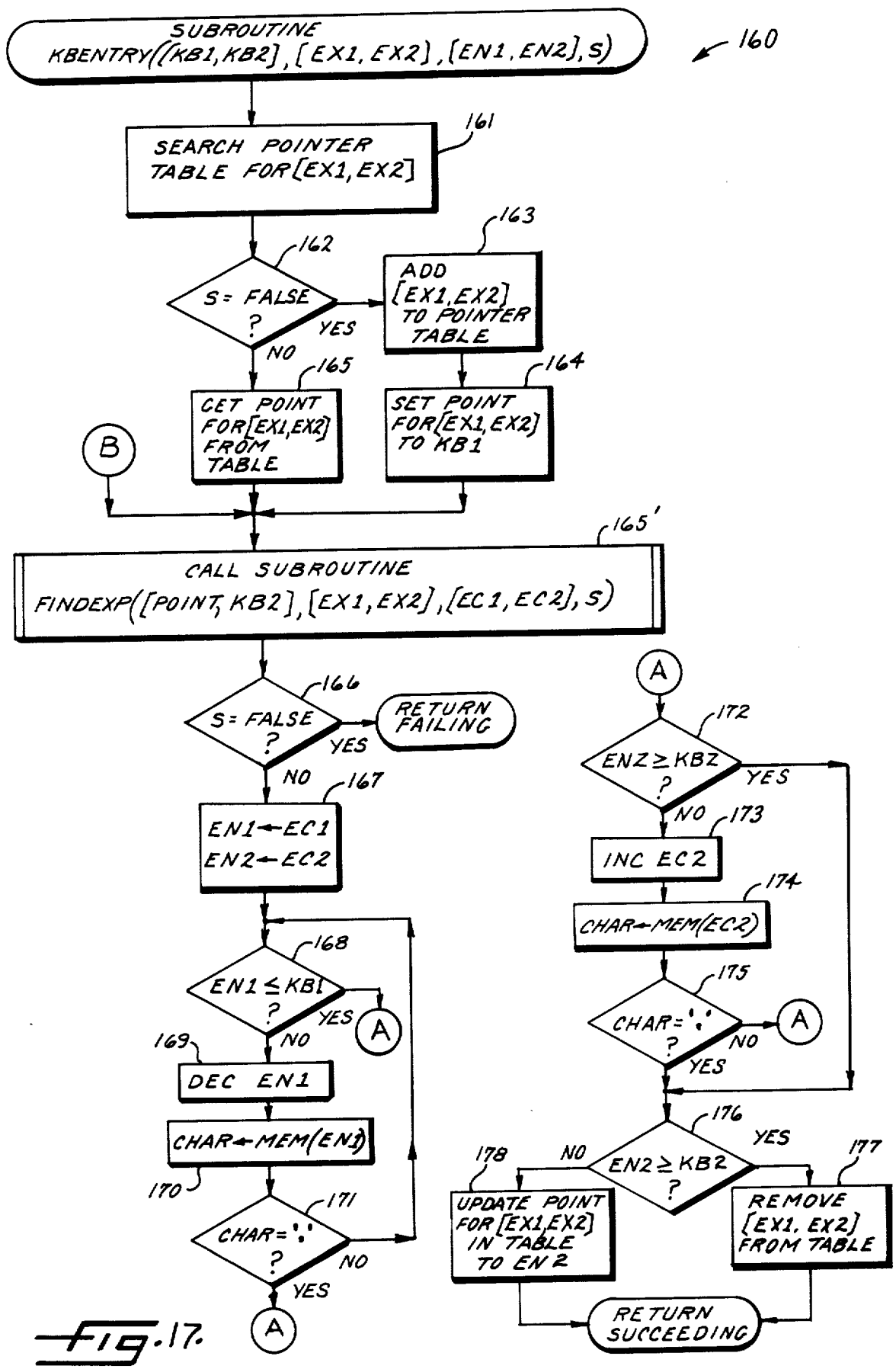
FIG. 17 is a flow chart of a subroutine for finding a knowledge base entry including a desired expression.

Turning now to FIG. 17, there is shown a knowledge base entry subroutine KBENTRY generally designated 160, which searches the knowledge base, starting at address KB1 and ending at KB2, for an expression in memory at a low address EX1 and a high address EX2. The subroutine KBENTRY returns the low and high addresses of the knowledge base entry EN1, EN2, respectively which includes the expression.

BEST efficiently searches the knowledge base for expressions since a search pointer table is used to store the addresses where searching left off for various expressions. In other words, during the backchaining of rules, a search for an expression that is found in the conclusion of a rule will be interrupted in the middle of the knowledge base in order to search other entries in the knowledge base for expressions in the premise of the rule. Thus, if the premise of the rule fails, searching for the expression in the conclusion can continue in the middle of the knowledge base rather than, for example, starting back at the beginning of the knowledge base.

In order to determine where the search should begin or continue in the first step 161 the pointer table is searched for an expression that is the same as the expression having the low address EX1 and high address EX2. If the search fails, then searching for the expression in the knowledge base has not previously been interrupted in the middle of a search. In other words, in step 162 the logical flag S is compared to the value false. If S is false, then the search failed and the expression, consisting of a string of characters, is added to the pointer table in step 163. Also, in step 164 the pointer in the table associated with the expression is set equal to the low address of the knowledge base KB1. If, however, the search succeeded as determined in step 162, then in step 165 the preexisting pointer for the expression is obtained from the table.

Now that a starting position has been obtained, in step 165' the subroutine FINDEXP is called (see FIG. 15) with the pointer POINT specifying the low address of the knowledge base for searching. In step 166 the logical flag S is compared to false to determine whether the search failed. If the search failed, then execution returns to the calling program. If, however, the expression was found in the knowledge base, then the delimiters of the knowledge base entry including the expression must be found in order to determine the beginning and ending addresses EN1, EN2, respectively, of the knowledge base entry. In step 167 the return parameters EN1 and EN2 are initially set to the beginning and ending addresses EC1 and EC2, respectively, of the expression in the knowledge base. In step 168, the return parameter EN1 is compared to the low address KB1 of the knowledge base. If the expression starts at the beginning of the knowledge base, then there is no need to search for a left delimiter since the first entry in the knowledge base is being considered. Otherwise, in step 168 the parameter EN1 is decremented and used as a pointer to obtain a character from memory in step 170 which is compared in step 171 to the knowledge base entry delimiter which is a period. If the character is not a period, then scanning to the left continues with step 168. Otherwise, the value for the return parameter EN1 has been properly determined and searching starts for the delimiter on the right of the expression. Thus, in step 172 the return parameter EN2 is compared to the upper most address of the knowledge base KB2. If the return parameter EN2 does not point to the top of the knowledge base, it is incremented in step 173 and used in step 174 as a pointer to obtain a character which is compared in step 175 to the delimiter for the knowledge base entry which is a period. Scanning continues until the delimiter is found or until the top of the knowledge base is reached at which time the proper values have been obtained for EN1 and EN2. Before returning, however, the pointer must be updated in the pointer table. If the return parameter EN2 points to the top of the knowledge base, as detected in step 176, then the expression is removed in step 177 from the table since the entire knowledge base has been searched. Otherwise, in step 178, the pointer for the expression in the table is updated to a value of EN2. Once the table has been updated or the expression has been removed from the table, execution returns to the calling program.

The searching by the KBENTRY subroutine as shown in FIG. 17 presumes that comments have been stripped from the knowledge base. Also, to speed up searching it is desirable that multiple blanks be stripped from the knowledge base as well. This stripping is performed by the KBLOAD subroutine shown in FIG. 18 and generally designated 180. In the first step 181, a buffer is set up for reading from the knowledge base disk file. The buffer, in other words, transfers a track of the knowledge base disk file to random access memory from which the characters may be obtained one character at a time. In step 182 a pointer PNT is set equal to the desired low address KB1 of the knowledge base in memory, and a memory location OLDC is set equal to the ASCII or character code of a blank. The subroutine KBLOAD receives a parameter KMAX denoting the maximum memory address allocated to the knowledge base buffer. In step 183 the pointer PNT is compared to this maximum address KMAX to determine whether there is sufficient random access memory to hold the entire knowledge base received from the knowledge base disk file. If the pointer PNT exceeds this maximum address KMAX, then in step 184 an error message is displayed to the knowledge engineer to indicate that the knowledge base disk file is too big. Then in step 185 the buffer is released and the logical flag S is set false prior to returning to the calling program.

If in step 183 it was determined that the pointer did not exceed the maximum address, then in step 186 the next byte from the buffer is read into a memory location CHAR. If the buffer is found to be empty in step 187, then the entire knowledge base disk file has been loaded into memory. In this case, the maximum address of the knowledge base is obtained in step 188 from the current value of the pointer PNTR. In step 189 the buffer is released and the logical flag S is set true. Execution then returns to the calling program.

If, however, in step 187 the buffer was not empty, then the previous character OLDC and the current character CHAR are both compared in step 190 to the character code for a blank to detect the presence of a multiple blank. If a multiple blank occurs, execution returns to step 183 in order to eliminate the current blank character CHAR. Otherwise, in step 191 the old character OLDC is compared to the character code for a slash (/) and the current character CHAR is compared to the character code for an asterisk (*), in order to detect the beginning of a comment. If a comment is not present, then in step 192 the current character CHAR is loaded into memory at the address specified by the pointer PNTR. In step 193 the pointer is incremented and the new character becomes the old character. Execution then returns to step 183 to read more characters from the knowledge base disk file sequentially into the knowledge base memory.

If a comment is detected in step 191, then the comment is read without transferring data to the knowledge base memory, until the end of the comment is detected. In step 194 the old character is replaced by the new character. In step 195 the next character is read from the buffer. If the buffer is empty as tested in step 196, execution is transferred to step 188 since the knowledge base disk file has been completely transfered to the knowledge base memory with a final comment being deleted. Otherwise, in step 197, the presence of the end of the comment is sensed by comparing the old character to an asterisk and the new character to a slash. If the end of the comment is not reached, execution returns to step 194. Otherwise, the value of the pointer PNTR must be adjusted and the old character OLDC must be reset to the values that they would have had but for the comment. In step 198, the value of the pointer PNTR is compared to the low address KB1 of the knowledge base memory. If the pointer is greater than the low knowledge base address, which is the usual case, the pointer is decremented in step 199. Also, if the pointer is greater than the low address of the knowledge base as tested in step 200, the old character is reset to the character in memory at one less than the pointer as computed in step 201. Otherwise, the old character is reset to a blank in step 202. The decrementing of the pointer in step 199 and the reseting of the old character in step 200 eliminates the initial slash in the left delimiter of the comment. Once the comment has been deleted and the pointer and old character reset to their proper values, execution returns to step 183.

Now that the base level subroutines have been described for the Basic Expert System Tool, the top and intermediate subroutines for conducting a consultation should be easily understood from the following description.

The subroutine KBGO generally designated 210 starts in step 211 by completely reseting or clearing the cache memory 20 (FIG. 1). Then, in step 212, the knowledge base is searched for initial data declarations in the form of "initialdata =L", where L is a list of expressions. For each initial data expression in the list L the subroutine SEEK is called to find the value of the expression. Then, in the final step 213, the knowledge base is searched for a declaration of goal expressions in the form of "goal =L" and for each goal expression in the list L, the subroutine SEEK is called to find the value of that expression, and the subroutine SHOW is called to display the value.

Figure 20:
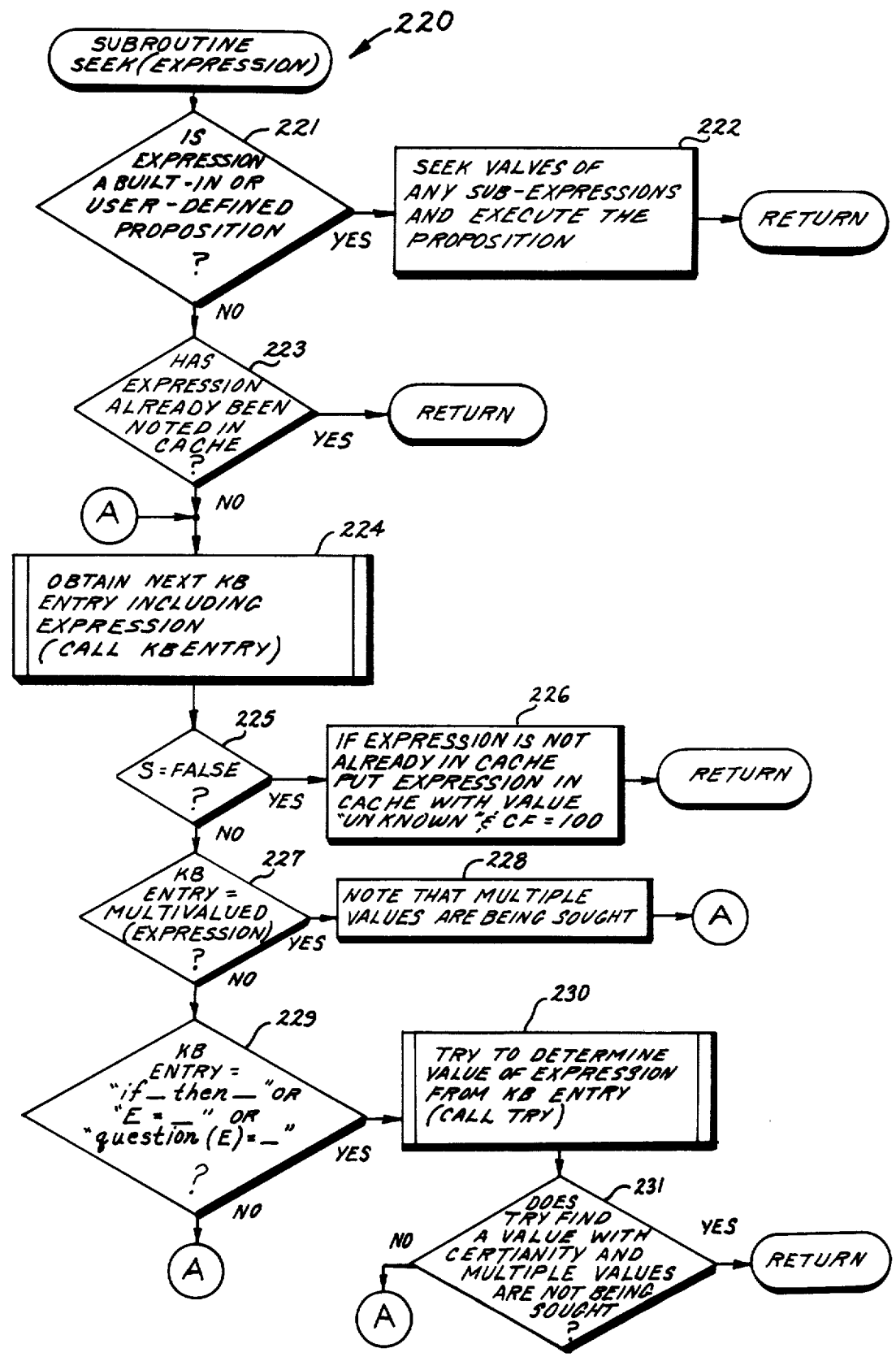
FIG. 20 is a flow chart of a subroutine for seeking the value of an expression.

Turning now to FIG. 20 there is shown a flow chart of the subroutine SEEK generally designated 220 which finds the value or values for a given expression, and stores the values in the cache memory. In the first step 221 the expression is compared or matched against a predetermined list of built-in and user-defined propositions. The built-in propositions are defined in Appendices IV and V and include arithmetic propositions, propositions about attributes, and knowledge access propositions. The propositions about attributes include, for example, whether a value for an expression is known, is being sought, or is definite. Knowledge access propositions include, for example, functions to return the value or values of an expression stored in the cache. As a specific example, the value of the proposition "mostlikely(X)" is the value of X with the highest certainty factor. This proposition is used to narrow down the scope of a search. The following selection rule, for example, could appear at the bottom of a "Wine Advisor" knowledge base having a single goal =[best-wine]:

---
rule: if mostlikely(wine) = X
then best-wine = X.
---

If the expression is a built-in or user-defined proposition, then in step 222 the values of any subexpressions or arguments for the built-in or user-defined proposition are sought and the proposition is executed to obtain the value for the given expression. It should be noted that steps 221 and 222 are rather conventional steps for an interpreter. An interpreter for the BASIC language for example, has such steps for evaluating arithmetic propositions.

If the given expression is not a built-in or user-defined proposition, then in step 223 the cache memory is searched for the expression. If expression has already been noted in the cache, then the subroutine SEEK is finished, and execution returns to the calling program.

If the expression is neither a predefined proposition nor already stored in the cache, then the knowledge base must be searched for an entry including the expression. For this purpose, in step 224 the subroutine KBENTRY (FIG. 17) is called to get the next such entry from the knowledge base.

Upon returning from the subroutine KBENTRY, the the logical flag S is tested in step 225 (FIG. 20) to detect the end of the knowledge base, but before returning the cache is checked in step 226 to determine if a value for the expression was found. If at this time the expression is not found in the cache, a certain value of "unknown" is assigned and stored in the cache for the expression so as to prevent future searches through the knowledge base for the expression.

If the end of the knowledge base was not reached, then in step 227, if the knowledge base entry declares the expression to the multivalued, this fact is noted in step 228 so that the knowledge base will be searched for multiple values. In step 229, the knowledge base entry is matched against templates for a rule, a fact defining the expression, or a question for a value for the expression. If the knowledge base entry is in one of these three forms, then in step 230, the subroutine TRY is called in an attempt to determine the value of the expression from the knowledge base entry. In step 231 the seeking of a value for the given expression terminates if the subroutine TRY finds a value with certainty and multiple values are not being sought for the expression.

Figures 19, 21:
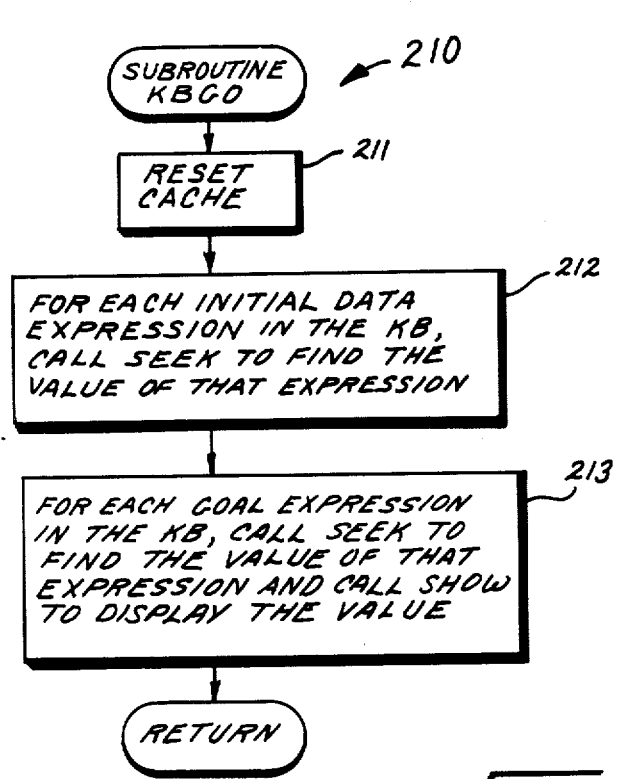
FIG. 19 is a flow chart of a subroutine for interpreting the knowledge base to run a consultation with the user.
FIG. 21 is a diagramatic representation of cache memory storing the value, certainty factor and reason corresponding to an expression when a value for the expression is determined.

It should be recalled that the cache is used to return the values of the expression which are found by the subroutine SEEK. The cache memory 20 is organized as shown in FIG. 21 in terms of a table with four entries for each expression-value pair. These four entries are character strings including an expression, a value; a certainty factor, and a reason. If a value for an expression is determined by a question, the reason is "yousaidso". If the value for the expression is concluded by a rule, the reason is the label of the rule. If the value of the expression is determined by a fact, the reason is the label of the fact. If a value was concluded by more than one rule or fact, the reason for the value is the conjunction of the labels for the rules and facts.

Figure 22:
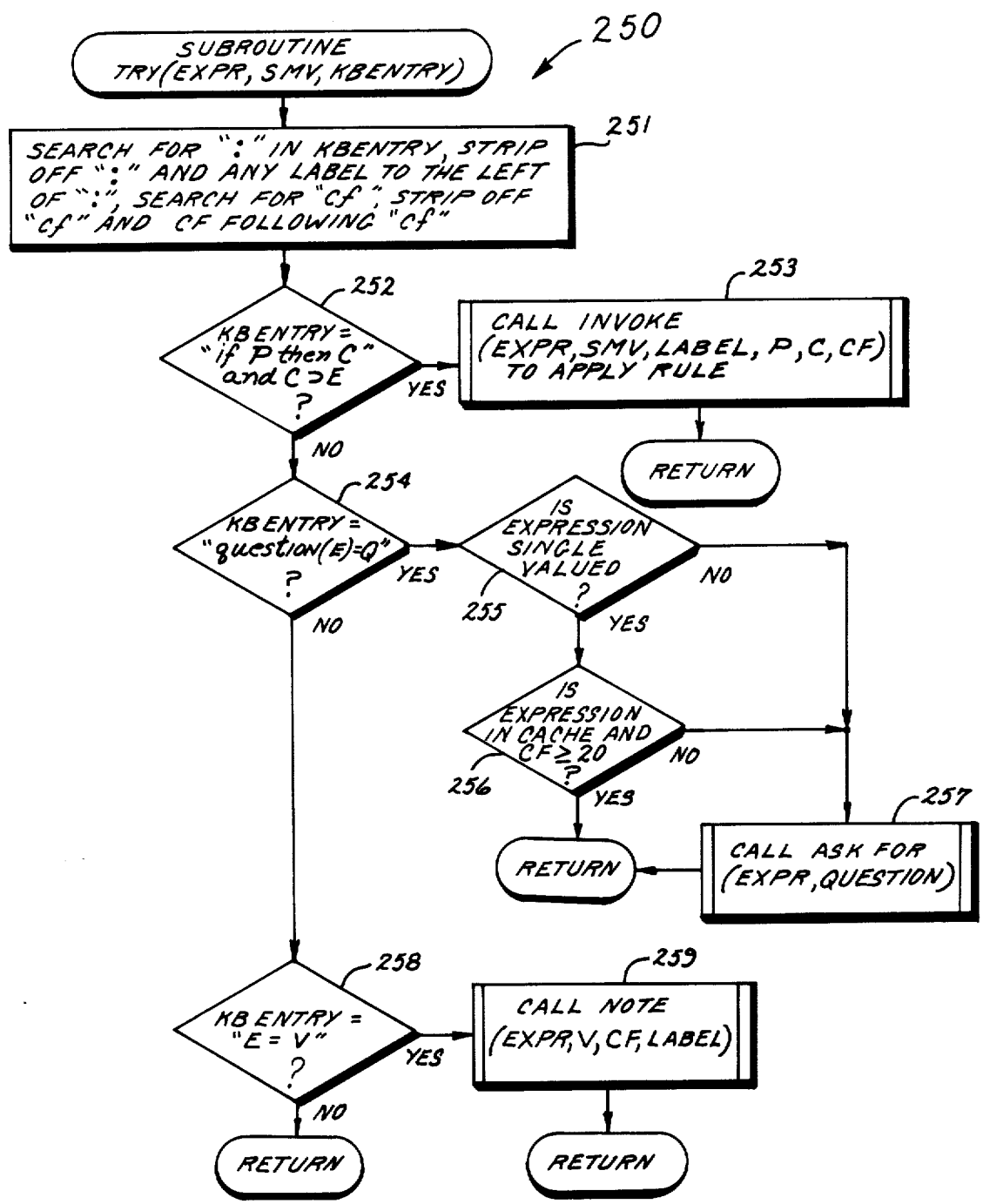
FIG. 22 is a flow chart of a subroutine for trying a knowledge base entry in an attempt to determine the value of a predetermined expression.

Turning now to FIG. 22 there is shown a flow chart of the subroutine TRY generally designated 250 which attempts to use a knowledge base entry to determine a value for the expression if the expression is single valued, or multiple values for the expression if the expression is multiple valued. A parameter SMV initially set to "single" by SEEK indicates whether the expression was determined to be multiple valued in step 228 of FIG. 20. In the first step 251, the label of the knowledge base entry and the certainty factor are stripped off the beginning and end of the knowledge base entry, respectively. Then, in step 252, the knowledge base entry is compared to a template in the form of "if P then C" to determine whether the knowledge base entry is in the form of a rule and to find the premise and conclusion of the rule. The conclusion is also searched for the given expression. If the knowledge base entry is in the form of a rule and the expression is in the conclusion of the rule, then in step 253 the subroutine INVOKE is called to apply the rule. If, however, the knowledge base entry is not in the form of a rule, then in step 254 the knowledge base entry is compared to a template in the form of "question(E) =Q". If the knowledge base entry is in the form of a question for the expression, then the user is asked the question unless the expression is single valued as tested in step 255 and the expression is in the cache and has a certainty factor greater or equal to 20% as tested in step 256. The user is asked for a value for the expression by calling a subroutine ASKFOR in step 257. If the knowledge base entry is neither in the form of a rule nor a question, then in step 258 the knowledge base entry is compared to a template in the form of "E =V". If the knowledge base entry is in the form of a fact declaring the given expression to have a particular value, then the expression is determined to have the particular value. In step 259 this particular value is recorded in the cache by calling the subroutine NOTE.

Figure 23:
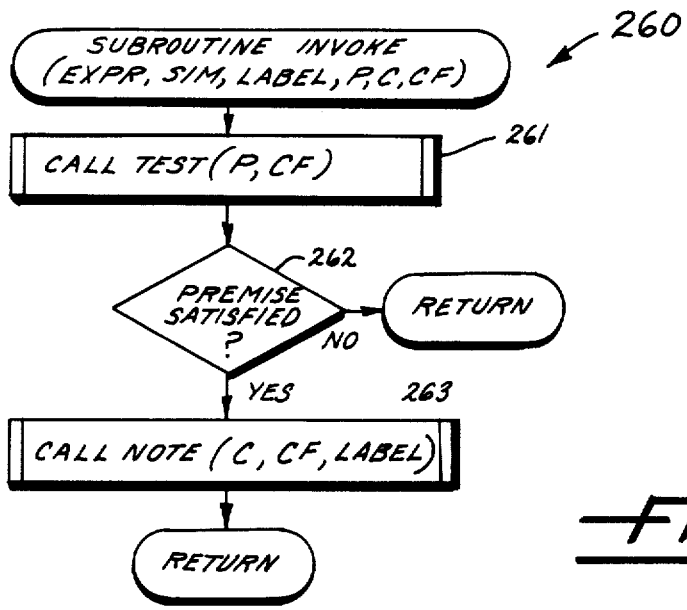
FIG. 23 is a subroutine for invoking a rule.

Shown in FIG. 23 is a flow chart of the subroutine INVOKE generally designated 260 for applying a given rule. In the first step 261 a subroutine TEST is called to test whether the premise of the rule is satisfied. If the premise is satisfied as determined in step 262, then in step 263 the conclusion is noted in the cache by calling the subroutine NOTE.

Figure 24:
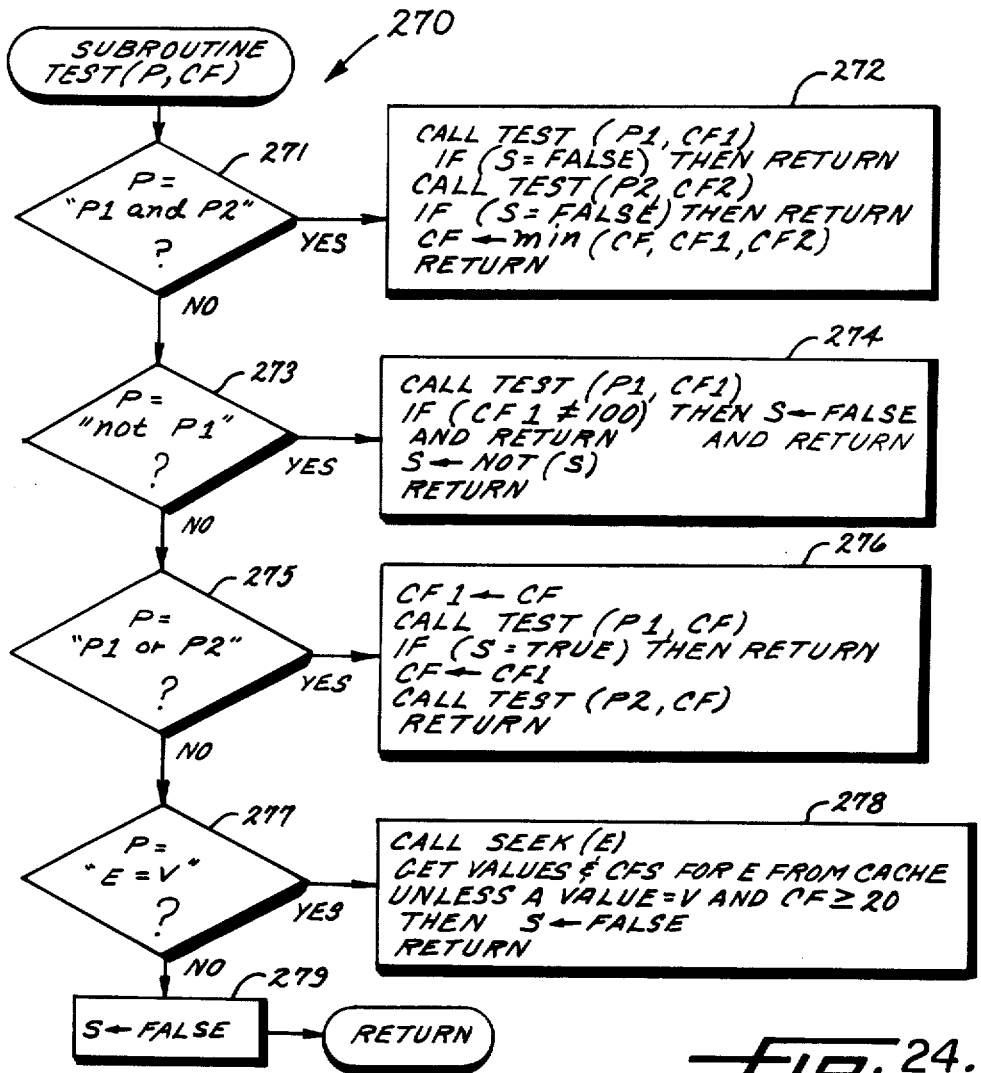
FIG. 24 is a subroutine for testing the premise of a rule.

Turning now to FIG. 24 there is shown a flow chart for the subroutine TEST generally designated 270. This subroutine matches the premise against templates to strip down the premise into its component parts according to the syntax shown in FIG. 11. The operation of the subroutine TEST is analogous to the execution of propositions in step 222 of FIG. 20. The logical operators "and", "not" and "or", however, are defined in a slightly peculiar fashion in order to determine a certainty factor indicating the degree of success of the premise. Also, the logical operation "or" is given precedence over the logical operation "and". The subroutine TEST breaks down the premise by recursively matching the premise against templates for the logical operations. In the first step 271, the premise is compared to the template, "P1 and P2" in order to remove and process all of the "and" logical operators in the premise. For each of the logical "and" operators, a special case sequence 272 is executed. The subroutine TEST is recursively called to test the first term of the conjunction. If the first term of the conjunction fails, then the entire proposition fails and execution returns. Otherwise, the subroutine TEST is recursively called for the second term in the conjunction. Assuming that there are no variables in the first term in the conjunction, if the second term of the conjunction fails so does the premise so that execution returns. (For the case of variables, the premise may succeed in a number of ways, and each possibility is checked, as described below in conjunction with FIG. 28). If both of the terms of the conjunction succeed, then the certainty factor for the premise is calculated as the minimum of the certainty factor of the rule and the certainty factors of the individual terms in the conjunction. Execution then returns with this combined certainty factor.

In step 273 the premise is matched against a template in the form of "not P1". If a "not" logical operator is found, then the special case sequence in step 274 is executed. The subroutine TEST is recursively called for the term P1. Unless the term P1 is determined with certainty, then the premise fails. Otherwise, the premise fails if the term P1 succeeds, and succeeds if the term P1 fails.

In step 275 the premise is matched against a template "P1 OR P2". If the premise is in the form of a logical disjunction, then the special test sequence in step 276 is executed. The subroutine TEST is recursively called for the first term P1. If the first term succeeds, then the entire premise succeeds. Otherwise, the subroutine TEST is called for the second term P2, and the premise succeeds or fails depending upon whether the second term P2 succeeds or fails.

Once the logical operators are stripped from the premise, the premise is in the general form of "expression = value" and is checked in step 277. Thus, the premise is in the general form which may be processed by the subroutine SEEK. In the special case procedure of step 278, the subroutine SEEK is called to find the values and certainty factors for the expression. Upon returning from the subroutine SEEK, the values and certainty factors for the expression are successively obtained from the cache. Unless one of the values from the cache is equal to the value stated in the premise and the corresponding certainty factor is greater than 20%, the premise fails.

If the premise cannot be recognized then in step 279 the logical flag S is set false to indicate that the premise fails, and execution returns.

Figure 25:
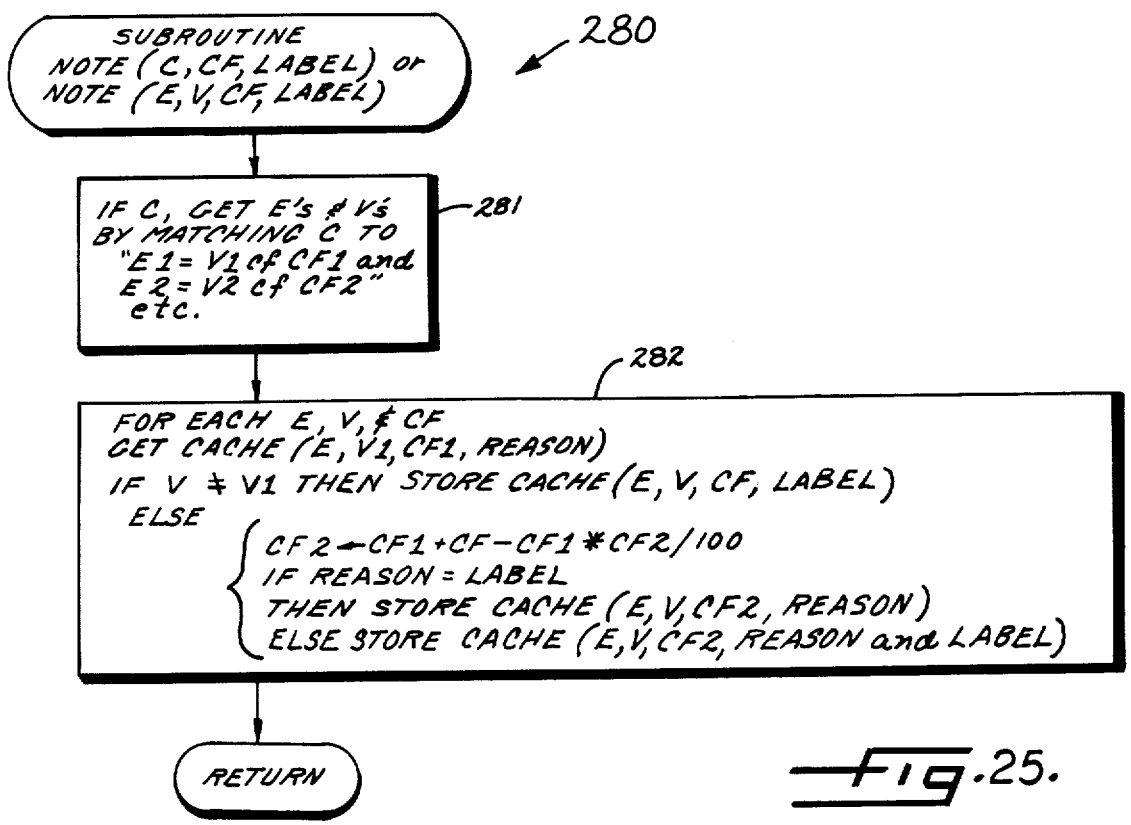
FIG. 25 is a subroutine for noting the conclusion of a rule or for noting the value of an expression.

Turning now to FIG. 25, there is shown a flow chart for the subroutine NOTE generally designated 280 which updates the cache when the premise of a rule succeeds or when a value for an expression is determined. If a premise of a rule succeeds, then in step 281, the expressions and values are obtained by matching the conclusion to the form of a logical conjunction of facts. In step 282, for each expression-value pair and certainty factor, the cache is first searched for the same expression and value. If the same expression and value are not in the cache, then the new value for the expression and the certainty factor and label for either the rule or fact are stored in a new entry in the the cache. Otherwise, the new value reinforces a previous determination of the same value. The reinforcement is noted by an increase in the certainty factor. The certainty factor is combined assuming that the certainty factors represent probabilities of independent events. Thus, the combined certainty factor CF2 is calculated according to:

$$CF2 = CF1 + CF - CF1*CF/100$$

It should be noted that the factor of 100 is included because certainty factors are stored as integers in terms of a percentage of certainty. Note only is the certainty factor reinforced when the same value is concluded repeatedly, but all of the contributing reasons are stored in the cache. If the reasons are the same, however, the original reason will suffice and the certainty factor is merely updated. Otherwise, the certainty is updated and the new label is joined as a conjunction with the previous reason.

Figure 26:
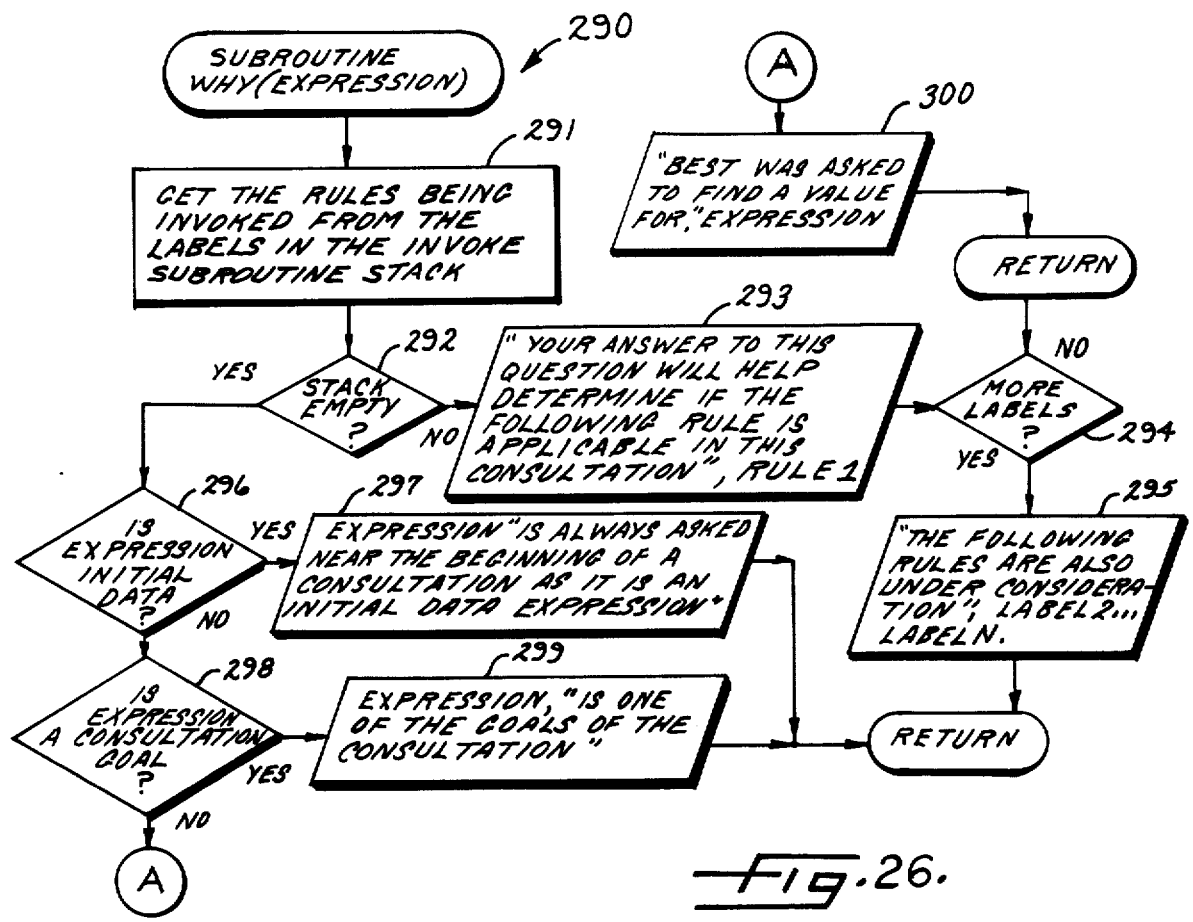
FIG. 26 is a flow chart of a subroutine for providing an explanation to the user of why BEST has questioned the user for a value for an expression.

Turning now to FIG. 26 there is shown a flow chart for the subroutine WHY generally designated 290 which explains to the consultation user why he is being asked for a value for a given expression. In the first step 291, the rules currently being invoked are obtained from the rules in the parameter stack of the INVOKE subroutine. It should be recalled that the INVOKE subroutine is recursively called to backchain rules, and hence there may be a number of rules currently being invoked. If this stack is not empty as tested in step 292, the user is told in step 293 that "your answer to this question will help determine if the following rule is applicable in this consultation". The first rule in the stack is listed. If, however, there are more rules in the INVOKE subroutine stack, as determined in step 294, then other rules are also being considered. Therefore, in step 295, the user is given a list of the labels of these rules after being told that "the following rules are also under consideration".

If the INVOKE subroutine stack is empty, then in step 296 the knowledge base is searched to determine whether the expression is in an initial data declaration. If so, the user is told in step 297 that the expression "is always asked near the beginning of a consultation as it is an initial data expression". If, however, the expression is not in the initial data expression, the knowledge base is searched in step 298 to determine whether the expression is declared as a consultation goal. If so, then in step 299 the user is told that the expression "is one of the goals of the consultation".

If it cannot be determined why the user is being ask for a value for a given expression, then in step 300 the user is merely told that "BEST was asked to find a value" for the particular expression.

With the internal details of BEST in mind, the reader should be able to understand how BEST interprets the "Wine Advisor" knowledge base listed in Appendix VII. The knowledge base includes knowledge about selecting a wine to be served with a particular meal. In general, the wine is selected according to the characteristics of the meal, the preference of the person drinking the wine, and the relative qualities of the wines themselves. Typical consultations are shown in Appendices VIII and IX.

BEST starts a "Wine Advisor" consultation by invoking the subroutine KBGO (FIG. 19) in response to the user entering a top-level command "go" after the high level prompt "?-". KBGO resets (clears) the cache and invokes the subroutine KBENTRY(goal =, goal =GLIST) to find the goal statement "goal =[wine]" at the top of the knowledge base. KBGO then calls SEEK (FIG. 20) to seek the first (and only) goal "wine" in the goal list GLIST. SEEK finds the cache empty and checks whether "wine" is multivalued by searching the knowledge base for the expression "multivalued (wine)" by invoking KBENTRY("multivalued(wine)", KBEN) and upon returning discovering that "wine" is multivalued. Next SEEK invokes KBENTRY(wine, KBEN) to find the first knowledge base entry KBEN involving the goal expression "wine", which is Rule 46. SEEK tries this first knowledge base entry to find a value for wine by calling TRY("wine", "multivalued", "rule46" P, C). Since "wine" is multivalued, KBENTRY and TRY are iteratively invoked until the knowledge base is found to be empty of remaining knowledge base entries including the expression "wine", and each of these entries are checked for other values of "wine".

In the first invocation of the TRY subroutine (FIG. 22), the knowledge base entry "rule46: etc." is matched against "L: if P then C" identifying the knowledge base entry as a rule and obtaining P = "recommended-color = red and . . . recommended-sweetness = sweet" and C = "wine = gamay". TRY then calls the subroutine INVOKE("wine," "multivalued," "rule 46", P, C) to apply Rule 46.

The INVOKE subroutine (FIG. 23) breaks down the premise P into individual logical propositions by sequentially matching the premise P against the templates "PR1 or PR2" and "PR1 and PR2", obtaining PR1 = "recommended-color = red." The individual logical clauses are matched against the template "E = V, CF" to obtain the expression E, value V, and CF for each clause. For the first clause, it is found that PR1 = "recommended color," V1 = "red" , and CF is 'null'. The individual logical clause are tested by calling the subroutine TEST (E, V, CF) for each clause until the premise P of the rule fails by virtue of an AND propositions failing or all of the OR propositions failing. TEST is first called with the argument list TEST ("recommended-color," "red," 'null'). SEEK is recursively called for the proposition "recommended-color" which is concluded by Rule 26. Rule 26 includes in its premise the expression "best-color" which is itself sought. In seeking "best-color" Rule 20 is invoked, which includes the expression "main-component" in its premise. The expression "main-component" is an argument for the question knowledge base entry asking the user "Is the main component of the meal meat, fish, or poultry?" Hence, the user is asked for one of the legal values "meat", "fish" or "poultry".

In the consultation of Appendix VIII, the user responds "poultry." This causes the premise of Rule 20 to fail, so that another rule concluding "best-color" is sought. The next such rule is Rule 21, which seeks a value for the expression "has-turkey." Consequently, question(has-turkey) is invoked asking the user "Does the meal have turkey in it?" The user responds "yes", causing Rule 21 to fail. The next rule concluding "best-color" is Rule 23, which requires a value for the expression "has-sauce." During seeking of a value for "has-sauce" question(has-sauce) is invoked asking the user "Does the meal have a sauce on it?" The user responds "yes", concluding a legal value for "has-sauce". Next Rule 23 seeks a value for "sauce" which invokes question-(sauce) asking the user "Is the sauce for the meal spicy, sweet, cream or tomato?" The user responds "sweet." This causes Rule 23 to fail. The next rule concluding "best-color", Rule 24, is invoked and succeeds using values already stored in the cache. The conclusion of Rule 24 sets "best-color" to white of 50. Execution returns to Rule 46, so that of Rule 24 has the effect of defining "best-color" as multivalued. Consequently, the rest of the rules concluding "best-color" are invoked. Rule 25 is the next rule concluding "best-color" and it fails since "main-component" is known to be poultry. Thus, execution returns to the invocation of Rule 26, which concludes "recommended-color" to be "red cf 80", 80 being the certainty factor of the premise of Rule 26.

Since the value of "recommended-color" is not concluded with certainty, the next rule concluding "recommended-color" is tried. Rule 27 concludes "recommended-color" is "white cf 50". Next, Rule 28 seeks a value for "preferred-color" invoking question(-preferred-color) which asks the user "Do you generally prefer red or white wines? " The user responds "white." Hence, Rule 28 fails. The next rule concluding "recommended-color," Rule 29, however, succeeds. Rule 29 concludes "recommended-color" is white cf 20. Since the cache at this point already includes the value of white cf 50, Rule 29 reinforces this previous value. The certainty factors are combined by the subroutine NOTE (FIG. 25) according to the formula:

$$CF \leftarrow CF + CF_{new} - (CF)(CF_{new})/100$$

thereby increasing the certainty factor for "recommended-color" is "white" to 60. At this point the cache contains the entries shown in FIG. 21.

Execution returns to the invoking of Rule 46, causing the seeking of values for "recommended-body" and "recommended-sweetness." Seeking of values for these expressions causes asking the user the questions "Is the flavor of the meal delicate, average, or strong?"; "Do you prefer light, medium, or full bodied wines?"; and "Do you generally prefer dry, medium or sweet wines?" In response to values obtained from the user, Rule 46 concludes "wine" is gamay cf 79%. "Wine," however, is multivalued as determined by the multivalued(wine) declaration at the top of the knowledge base. Consequently, all of the wine-determining Rules 46-57 are invoked. Since "wine" is a goal of the consultation, the "Wine Advisor" of Appendix VIII lists all of the values for "wine" in order of decreasing certainty factor. This concludes the "Wine Advisor" consultation in Appendix VIII.

The explanation facilities of BEST are illustrated in the "Wine Advisor" consultation of Appendix IX. In response to the user responding "why" to the question prompt ">>", the WHY subroutine (FIG. 26) lists the rule last invoked and the labels of the other rules under consideration.

Now that the reader has a basic understanding of BEST the instantiation and deinstantiation of variables can be explained. The ability of BEST to handle variables in recursive rules enables BEST to handle an unlimited range of problems. Technically speaking, the BEST expert system language is a universal language since any computer program can be translated into the BEST language. This should be evident from the ability of BEST to handle arbitrary expressions, variables, and logical and arithmetic operations. Moreover, BEST is extensible since the knowledge engineer can extend BEST's capabilities, for example, by defining functions. As an expert system tool, however, BEST is designed to perform as an efficient backchaining goal-directed inference engine. Due to this objective, there is one significant limitation on the use of variables. Simply stated, this limitation is that an expression cannot be evaluated unless the variables in the expression have already been instantiated in the knowledge base entry.

Variables are useful for two distinct purposes. The first is to receive and pass the individual values of an expression. This purpose was illustrated above in the example:

```
rule3:  if preferred-body = X
        then recommended-body = X.
```

During the application of such a rule, the variable X becomes instantiated to the first value of the expression "preferred-body" when the rule premise is tested and it is found that the variable X can assume an arbitrary value. The first value of the variable X is later transferred to the expression "recommended-body" when the conclusion is noted. This testing of the premise and noting of the conclusion is iterated for all of the rest of the values of the expression "preferred-body."

The second purpose of a variable is to pass values to a function in the knowledge base. An example of this use is illustrated by the "Factorial Calculator" knowledge base in Appendix X to the specification. The factorial function "fact-N" has an informal argument N merely appended to the functor "fact-". Functions may also have strings of formal arguments such as "functor-(Arg1, Arg2, Arg3)". The function variables are instantiated to argument values when the knowledge base is searched to find the value of the function with stated argument values. The argument variables match with and are instantiated to corresponding argument values, resulting in the rule or fact being applied to return the function value.

The factorial function "fact-N" is recursively defined by Rule 1 in the "Factorial Calculator" of Appendix X. Since the rules may be recursive, the variable bindings are local to the knowledge base entries, and are stored in a variable table for each rule or fact that is currently being tried.

Figure 27:
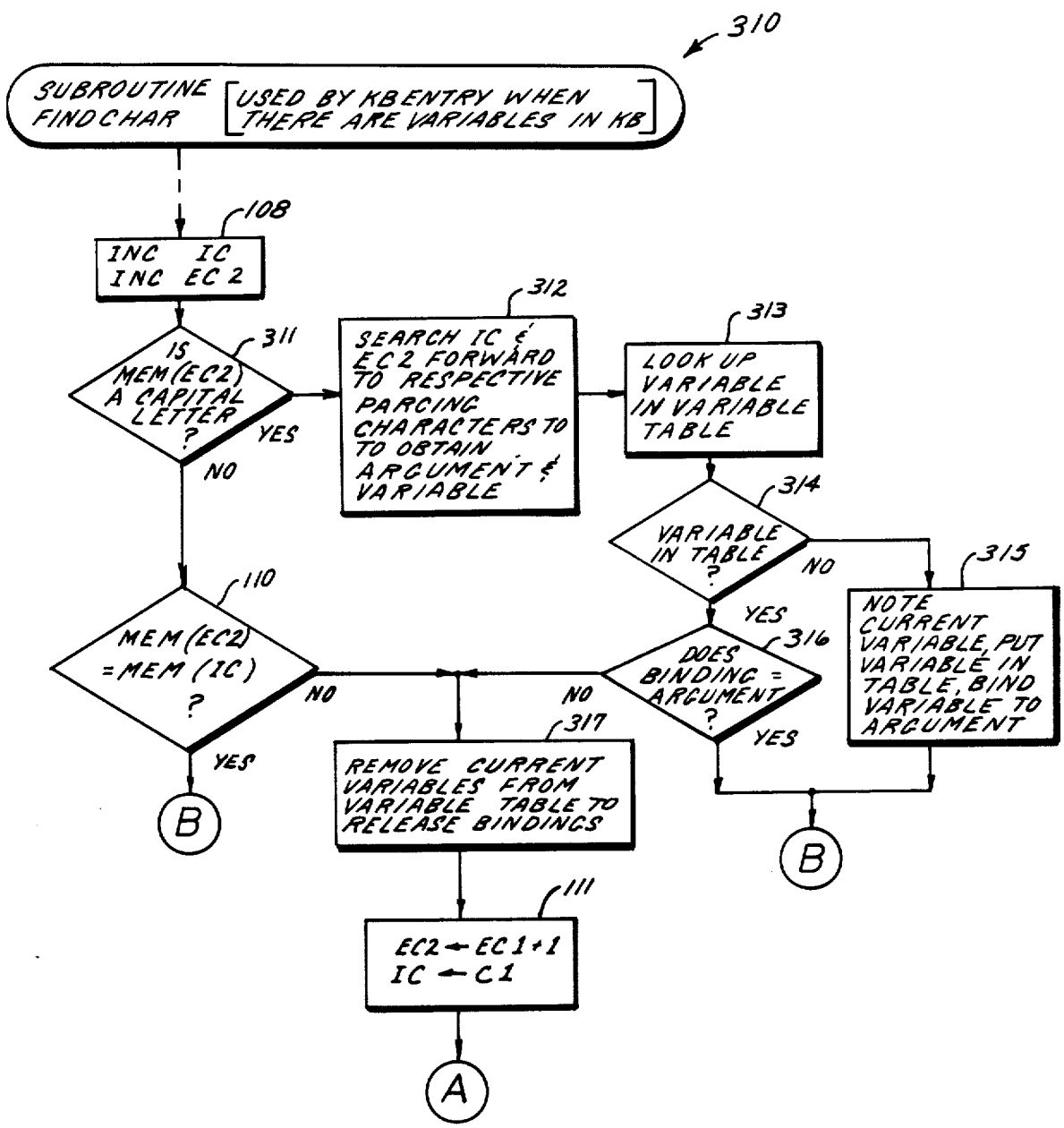
FIG. 27 is a flow chart of the modification to the subroutine in FIG. 14 to permit the binding of arguments to function variables when the knowledge base is being searched for a function.

The modifications to the FINDCHAR subroutine of FIG. 14 to perform a simple method of binding argument variables is shown in FIG. 27. The modified subroutine generally designated 310 has a step 311 to detect the presence of a capital letter after the initial matching of an expression. Once the capital letter is detected, in step 312 the expression pointer IC and the knowledge base pointer EC2 are used to search forward to the next respective parsing characters (blanks or commas) to obtain the variable and matching argument value. In step 313 the variable table is searched for the variable. If the variable is not already in the table and hence unbound, as determined in step 314, the variable is bound in step 315 to its corresponding argument value. Otherwise, in step 316, the argument value is compared with the variable's binding. If the values do not match, all of the current bindings must be released by clearing the variable table for the current knowledge base entry in step 317 since the function cannot be applied. Otherwise, searching may continue for more argument values and function variables.

It should be apparent that an expression should be searched for variables and the variables replaced with their bindings in the very first step of the SEEK subroutine 220 in FIG. 20. Also, when an expression is set to a value, the variables in the value should be replaced with current bindings. Thus, the first step in the NOTE subroutine 280 in FIG. 25 should search for variables in the value to be noted and replace them with their current bindings. To prevent the stack of variable tables from overflowing, all bindings for the current knowledge base entry should be released just prior to returning from the TRY subroutine 250 in FIG. 22.

Figure 28:
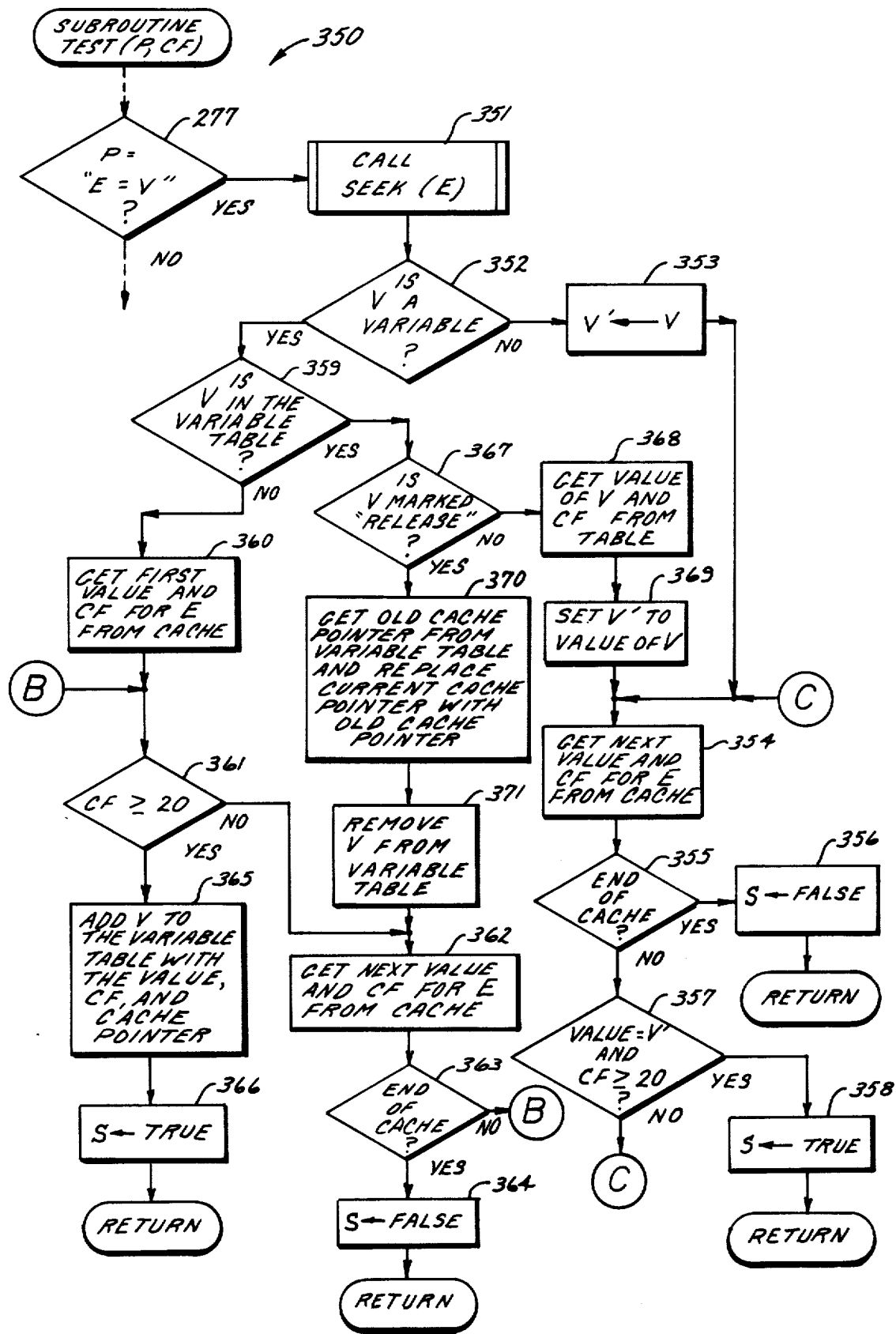
FIG. 28. is a flow chart showing the modification to the subroutine of FIG. 24 to permit the binding of a variable to the value of an expression in the premise of a rule.

The instantiation, substitution, and deinstantiation of variables during the testing of a rule premise is illustrated in FIG. 28. In step 351 of the modified TEST subroutine 350, SEEK is called to insure that a value and certainty factor for the expression is stored in the cache. Then in step 352 the value V is inspected to determine whether V is a variable.

If V is not a variable, then in step 353 the value V is transferred to V'. In step 354 the next value and certainty factor for the expression E is obtained from the cache. If the end of the cache is reached, as tested in step 355, the premise fails. The logical flag S is set false in step 356 and execution returns to the calling program. Otherwise, in step 357, the value for the expression is compared to V' and the certainty factor is compared to 20. If the value for the expression matches V' and the certainty factor is at least 20, then the premise succeeds. The logical flag S is set true is step 358 and execution returns to the calling program. Otherwise, the premise might succeed for some other value of the expression E, and execution jumps back to step 354 to get another value and certainty factor for the expression E from the cache.

If in step 352 the value V was found to be a variable, then in step 359 the current variable table is searched to determine whether the variable V has already been instantiated. If the variable V is not in the current variable table, then in step 360 the value and certainty factor for the expression E is obtained from the cache. Then in step 361 the certainty factor is compared to 20 to test whether the premise can be satisfied, with sufficient certainty, by binding the variable V to the value and certainty factor. If not, then in step 362 the next value and certainty factor for the expression E is obtained from the cache. If the end of the cache is reached, as tested in step 363, the premise fails. The logical flag S is set false in step 364 and execution returns to the calling program. Otherwise, execution jumps back to step 361 to test the certainty factor.

Once a certainty factor of at least 20 is found, in step 365 the variable V is instantiated by adding V to the current variable table along with the value and certainty factor. In step 366 the logical flag S is set true and execution returns to the calling program.

If in step 359 the variable V was already in the variable table, the variable table is checked in step 367 to determine if the variable has been marked "RELEASE" in a fashion described below. If not, in step 368 the variable's binding, or value, is obtained from the variable table, and in step 369 the value is transferred to V'. Execution continues in step 354 in the fashion already described.

The variable V is always instantiated to just a single value of the expression E at any given time. So that attempts will be made to apply the current rule for all possible instantiations, and all possible combinations of instantiations if the rule includes multiple variables, just before returning from the INVOKE subroutine of FIG. 23, the current variable table is searched for the cache pointers to determine whether a variable has been instantiated to satisfy the premise of the current rule. If so, the last of such variables is marked "RELEASE" and execution jumps back to step 261 in FIG. 23 in an attempt to satisfy the rule using a different set of variable instantiations. This process of jumping back to try different variable instantiations is called "backtracking".

If in step 267 of FIG. 28 it is found that the variable V is marked "RELEASE", then in step 370 the old cache pointer for the variable V is obtained from the current variable table and the current cache pointer is replaced by the old cache pointer. Thus, the old cache pointer stored in the variable table keeps track of where the last used value for the expression E was obtained from the cache. In step 371 the variable V is removed from the variable table so that the re-instantiation process may continue in step 362 in the same fashion as described above.

One of the major advantages of implementing BEST in PROLOG is that PROLOG inherently instantiates variables. PROLOG easily perform backtracking and inherently matches variables in a function argument list when the knowledge base is searched.

Figure 18:
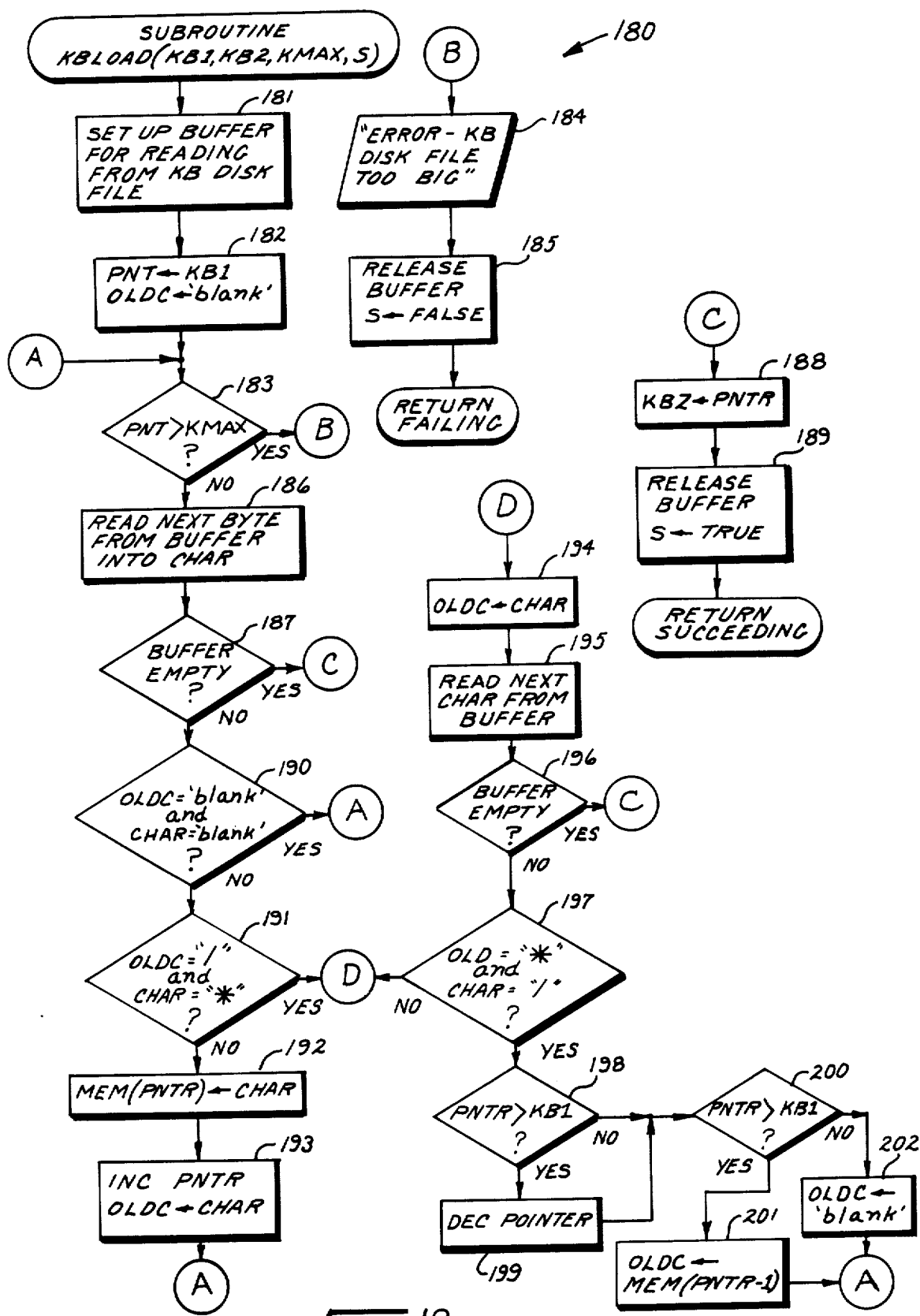
FIG. 18 is a subroutine for loading a knowledge base disk file into working memory and stripping multiple blanks and comments during the loading process.

In a preferred PROLOG embodiment, the KBLOAD subroutine of FIG. 18 generates a single PROLOG fact for each knowledge base entry. Each PROLOG fact is a unique definition of the predicate "kbentry" and the corresponding knowledge base entry is the argument for the predicate. In other words, the PROLOG data base for the knowledge base is in the form of:

```
kbentry([knowledge base entry 1]).
kbentry([knowledge base entry 2]).
kbentry([knowledge base entry 3]).
   .
   .
   .
```

The KBENTRY subroutine of FIG. 17 is then merely a PROLOG statement in the form of:
kbentry(EXPR, L: KB).
The variable L becomes instantiated to the label and the variable KB becomes instantiated to the rest of the current knowledge base entry. Matching of the knowledge base entry to a template is performed, for example, by the PROLOG statement:
KB=if P then C PROLOG also supports list processing by matching the arguments X and Z of the function "[X|Z]" to the first element and the list of the remaining elements, respectively, in a string of argument values. Thus, if the knowledge base entry is a fact in the form of:
fact1: expr=[1, 2, 3, 4].
then execution of the PROLOG statement:
kbentry(list, expr =[X|Z])
instantiates the variable X to the item 1 and instantiates the variable Z to the list [2, 3, 4].
Consider, for example, the knowledge base below:

```
fact1: sum-of-[N] = N.
rule1: if sum-of-REST = RSUM and
       FIRST + RSUM = SUM
       then sum-of-[FIRST|REST] = SUM.
```

If the variable N is instantiated to a list of numbers and the knowledge base is searched for the value of the expression sum-of-[N], the variable SUM will become instatiated to the sum of the numbers in the list N which will become the declared value of the function sum-of-[N].

Another advantage of a PROLOG embodiment is that the knowledge engineer can write PROLOG subroutines. To aid the knowledge engineer, it is desirable for BEST to include a built-in proposition "prolog(EXPRESSION)" that, when found in the knowledge base and evaluated by the subroutine SEEK, passes the EXPRESSION to the PROLOG module (42 in FIG. 3) for execution as a PROLOG subroutine. Uninstantiated variables in the EXPRESSION serve as return parameters. It is also desirable to permit the PROLOG EXPRESSION to call directly at least some of the BEST subroutine modules (FIGS. 4 and 5) so that the PROLOG EXPRESSION may look up or note values for expressions in the cache.

A program listing of a PROLOG version of BEST is included in Appendix XI to the specification. As an illustration of the PROLOG backtracking feature, consider the highly simplified excerpt shown below:

```
test(P and Q, CF) :-
   test(P, CF1),
   test(P, CF2),
   minimum(CF1, CF2, CF).
test(E = V, CF) :-
   unless(sought(E), seek(E)),
   lookup(E = V cf CF because R).
seek(E) :-
   assert(sought(E)),
   kbentry(E, KB),
   try(KB),
   !
   seek(E).
try(L: if P then E = V cf CF1) :-
   test(P, CF2),
   CF is (CF1 * CF2)/100,
   assert(lookup(E = V cf CF because L)),
   fail.
try(L: question(E) = Q) :-
   write(Q),
   read(V),
   note(E = V cf 100 because yousaidso).
```

Note that the first set of clauses for TRY finishes with a FAIL statement. This means that the first set of clauses can never succeed. Immediately after noting the conclusion, the first set of clauses fails causing backtracking into TEST to see if TEST can produce another way of binding the variable that makes the premise true. Suppose, for example, the cache contained the following two facts:
  best-color=red cf 70 because rule 1.
  best-color=white cf 40 because rule 2.
That is, there is evidence that the best color should be red and there is also evidence (but less) that it should be white. Suppose the knowledge base contains the following rule:
  rule 3: if best-color = C then recommended-color = C cf 80.
That is, if there is a C such that there is evidence that C is the best color to have, then recommend C. Consider what happens if we now SEEK(RECOMMENDED-COLOR). The knowledge base is searched for entries relevant to RECOMMENDED-COLOR. Suppose that only rule 3 is found. It will be tried, thus:
  try(rule3: if best-color=X then recommended-color=X cf 80).
This will cause BEST to test the premise of the rule:
  test(best-color =X, CF2).
Since BEST-COLOR is already sought, this TEST is satisfied by a simple lookup to the cache. The first matching entry binds X to RED and CF2 to 70, so that NOTE is called:
  note(recommended-color=red cf 56 because rule3).
Then BEST encounters the FAIL statement, backtracks into TEST, and picks up the second binding for X resulting in:

note(recommended-color=white cf 42 because rule 3).

Then BEST encounters the FAIL a second time, and TEST also fails since there are no more matching cache entries. TRY fails back into SEEK which tries for another knowledge base entry. If there are more knowledge base entries for recommended-color, then they are TRYed; if not, the first clause of SEEK fails and the second 'dummy' clause catches the failure.

The simplified mechanism as described above has some value but it is vastly improved by permitting expressions to be declared either single valued or multiple valued. The benefits of incorporating this distinction are both declarative and procedural. Declaratively, a single valued expression is one that can have only one value. If some particular value is certain then even if there is evidence for other values, those other values can be ignored. A multivalued expression may, of course, have many values. For a multi-valued expression, the fact that one value becomes certain is of limited interest. It is, however, the way the distinction is implemented that is of real value. BEST enables the knowledge engineer to write conventional procedures as well as embody heuristic knowledge.

To incorporate the single valued/multivalued distinction in the PROLOG code above, instead of simply FAILing at the end of TRY, the expression is tested to determine if it is now certain:

```
try(L: if P then E = V cf CF1) :-
    test(P, CF2),
    CF is (CF1 * CF2)/100,
    note(E = V cf CF because L),
    kbentry(E, multivalued(E)),
    lookup(E, ANYVALUE, 100, ANYREASON).
```

The last two steps of this procedure succeed if E is singlevalued and definite. Since TRY succeeds, SEEK does NOT fail back into KBENTRY and so the SEEK is complete. Further features and advantages will become apparent to the reader familiar with PROLOG upon inspection of the PROLOG listing in Appendix XI to the specification.

In view of the above, a useful and versatile knowledge engineering tool has been described for building knowledge systems and running consultations. The knowledge engineering tool is easily mastered by people with little computer experience yet also provides advanced capabilities for the experienced knowledge engineer. The language of the knowledge base is transparent, universal, and extensible, and supports certainty factors, recursion, symbolic or universally quantified variables, and user-defined functions. The knowledge engineering tool is easily implemented in PROLOG to enable the knowledge engineer to write and add PROLOG subroutines to the knowledge base.

APPENDIX I
Glossary atom
  The atom is the smallest indivisible unit in the BEST knowledge base capable of being permanently set to a definite value or values during a consultation. Once set, the value or values of an atom remain until a new consultation is run. BEST recognizes any phrase of characters starting with other than a capital letter as an atom unless that phrase is a reserved operator or designated a label or comment. Here are some examples of atoms:
  color
  red
  wine attribute
  Attributes are the subjects of rules and facts. For example, in the BEST fact "color is blue", color is the attribute. Conceptually, attributes describe objects. For example, the object wine has three attributes: color, body and sweetness.

auto-complete
  BEST auto-completes answers to make consultations easier for the user. If the user does not type in all of the the letters of an answer, then BEST will auto-complete the answer. To complete an answer, BEST searches a list of acceptable answers in the knowledge base (termed "legalvals") and then selects the answer that has the same first letters as what the user typed in. If the possibilities are "yes" or "no" and the user types "n", then BEST will choose "no".

backchaining
  See backward chaining.

backtracking
  "Backtracking" describes the process of retrying facts. When a premise has a logical variable and the first attempt to find the variable's value fails, then backtracking starts. Another value is tried. Retrying continues until a correct value is found or until no more values are available.
  Suppose that in the following example, BEST tries all possible values of integers starting with 1.

```
if integer = X
and integer = Y
and X + Y = 3
then sum = 3
```

The first possible combination, X=1 and Y=1, will fail. BEST will backtrack and try a second combination. The second combination, X=1 and Y =2, will succeed. With the rule now made true, backtracking will stop.

backward chaining
  "Backward chaining" and "backchaining" both describe BEST's inference method. At the start of a consultation, BEST finds a goal in the knowledge base. BEST then works backward from the goal, finding final rules that conclude the goal, finding rules that conclude the premises of the final rules, and so on. With backchaining as a driving force, BEST finds values for expressions and makes rules come true whenever possible.

bind, binding, bound
  A variable is bound when it is assigned a value. In other words, a variable's binding is its attachment to a value. In BEST, variables may be bound, unbound, and then bound again through the process of backtracking.

cache
  Cache is the memory or storage which becomes set when the values for an expression are sought. The cache is organized as a table of entries including an expression and one of its values and the respective certainty factor and reason for the value.

certainty, cf, confidence
  A confidence is a number that expresses how likely it is that a proposition is true. In BEST, confidence factors range from 0 (meaning there is no supporting evidence) to 100 (meaning definitely). Confidence factors influence not only BEST conclusions, but also the users' interpretation of them.
  The terms "confidence", "confidence factor", "cf", "certainty", and "certainty factor", are used interchangably.

consultation
: A consultation is a question-and-answer session with the knowledge base. See also, "consultation mode".

consultation mode
: When BEST is in consultation mode, it is working to satisfy a goal. It is searching the knowledge base for rules that will lead to the goal conclusion and it is invoking these rules. When BEST is in consultation mode, it is asking the user the questions that were programmed by the knowledge engineer.
: When the special prompt ">>" appears, BEST is in the consultation mode.

declarative semantics
: Declarative semantics are embodied in facts and rules. Declarative semantics describe knowledge without telling how to process it. Consider the facts:
: fact1: color is red
: fact2: color is white
: These facts taken together mean that "color" is both "red" and "white". In interpreting declarative semantics, one does not care when these facts will be used.

dual semantics
: The semantics of a language is its meaning. The BEST language has dual semantics, or can be interpreted in two ways. First, BEST has procedural semantics which describe the sequence of things to be done. For example, we know from the procedural semantics which rules will be tried first. By contrast, BEST declarative semantics do not tell us when rules will be used. Instead declarative semantics declare rules and facts without regard to how and when they will be processed.
: See also "procedural semantics" and "declarative semantics".

extensible
: An extensible language or tool is one that can extend itself. For example, the English language is extensible. By defining new words, we extend the language. BEST is extensible in a more dramatic way: BEST's grammar is extensible.

expression
: A unit in the BEST knowledge base capable of having a value or values. The extensibility and power of BEST derives from the fact that any divisible subset of the knowledge base is an expression. The syntax of the BEST language defines divisible subsets. Indivisible subsets or units of the knowledge base include atoms, variables, operations, labels and comments.

fact
: In BEST a fact states a relationship that may be proved true, untrue or true with some confidence. BEST facts consist of "atomic propositions" plus certainty factors. The following are facts:
: color-of-fruit=yellow
: best-color=white of 90
: Facts not only appear in rules, but also stand alone as knowledge base entries. The premises and conclusions of all rules are facts.

function
: An expression prefixed by an operator called a "functor" and including a list of expressions called "arguments." The argument list is enclosed in parentheses and delimited by commas.

functor
: The prefix part of a function goal
: A goal is an expression for which the value is being sought. If the goal is "wine" then BEST will attempt to prove rules or ask questions that conclude "wine". From another point of view, a goal is an object that the knowledge base describes.

if-then rule
: An if-then rule is a rule that take the form:
: if <PREMISE> then <CONCLUSION>.
: See also "rule".

inference tracker
: An inference tracker is a trace facility for the knowledge engineer. The tracker displays facts and rules as they are invoked. It also displays values of logical variables. The BEST tracker allows the user to choose what things to display during a consultation.

infix
: "Infix" describes the position of an operator within an expression. For example, to denote the sum of A plus B, we might use a prefix operator "+":

```
+ A B
```
or an infix operator " + ":
```
A + B
```

: In BEST, some infix operators are used just to make rules more legible. In a rule including "preferred-color" an infix operator "-", connects the words "preferred" and "color" so that BEST recognizes "preferred-color" as a single atom or attribute.

integer
: An expression having an integer value. It is distinguished from an atom since it comprises only numerical digits. Its value is predetermined by the digits and cannot be set by the user.

invoke
: A rule is invoked when it is tested. When the rule is tested, the inference engine seeks to find whether the rule is true in a particular instance. Invocation includes testing each of the premises in the rule plus asserting any conclusions drawn.

instantiated, instantiation
: A variable instantiation is its binding. See "binding".

knowledge auditor
: The knowledge auditor records a consultation. Rule and instantiation data are both automatically recorded by BEST's knowledge auditor. These records are used whenever the user asks for explanations such as "why" or "show".

KB, KBS, KE, KS
: Knowledge base, knowledge-based system, knowledge engineer, knowledge system.

knowledge base
: A knowledge base is a collection of rules and facts that embody knowledge about a particular subject or domain. The knowledge base is written in a language or syntax that can be interpreted or understood by both BEST and the knowledge engineer.

knowledge base entry
: A knowledge base entry is a single statement in the knowledge base. This entry may be a rule or it may be a fact. If the entry is labeled, then the label is also part of the knowledge base entry. Knowledge base entries are terminated or delimited by periods.

knowledge base patcher
: The knowledge base patcher allows the knowledge engineer to add and remove rules and facts during a test consultation.

knowledge engineer
: A knowledge engineer writes knowledge bases.

label
: A phrase of characters in the knowledge base that merely identifies a knowledge base entry for the user's convenience.

logical variable
: A logical variable is a variable which is universally quantified. This is called a logical variable because it is used in logic programming. BEST variables are logical variables.

operator
: A phrase of characters that is included in a predefined set of phrases defining BEST's syntax and indicating that other phrases of characters in the knowledge base are to be grouped into indivisible subsets such as atoms, variables, labels, and comments. Operators also specify how the knowledge base is to be interpreted when a consultation is run, expressions are sought and evaluated, and rules are interpreted.

meta-
: In computer science, this prefix implies recursion. As examples: a meta-note is a note about notes and a meta-language is used to create languages. A meta-proposition says something about a proposition rather than an attribute.

procedural semantics
: The procedural semantics of BEST tells us when actions will be taken. Consider these facts:
  fact1: color is red
  fact2: color is white
  With the facts listed in this order, fact1 will always be used before fact2.

Prolog
: Prolog is the preferred high-level programming language for implementing BEST. The name Prolog comes from "programming in logic".

prompt
: A prompt invites the user to type something in. BEST prompts includes these:

```
 | ?-
 |
 >>
```

Next to the prompt the user can type a command or an answer to a question.

proposition
: A proposition is a statement that potentially can be proved either true or not true. Both facts and rules are propositions.

question
: A question is BEST's last resort in seeking a value for an attribute. If there are no rules that conclude the sought-after attribute, then BEST will ask the user for a value. The knowledge engineer can program nicely worded questions using the "question" statement. The knowledge engineer can also define legal values, "legalvals", to limit the accepted answers to a question.

reason
: In BEST, a "reason" justifies why a fact is true. More specifically, a "reason" is the rule or input that finally decided the truth value of a fact. For example, it may be true that "wine is white of 20 because of rule29". This means that rule 29 concluded "then wine is white of 20". On the other hand, "meal has sauce cf 90" may be true because "yousaidso", meaning that you were asked whether the meal had sauce and you said "yes cf 90".

rule
: Most rules in BEST are if-then rules of this form:
  if <premise> then <conclusion>.
  The premises and conclusions are made up of facts connected by operators "or" and "and". (Only premises may contain "or").

seek
: Seeking is BEST's primary activity. BEST's job is to prove or disprove the goal conclusions. To prove that a conclusion is true, BEST must find the values that make it true. This process of finding values to prove goals and subgoals is called seeking.

simple fact
: A simple fact is a fact without a certainty factor. (See "fact".) In other words, the atomic proposition states a fact that may be true or false. Some examples of simple facts are:
  best-color =red
  recommended-color =white table entry
: Facts are sometimes called table entries if there are many similar ones.

test consultation
: A consultation or test case is run by the knowledge engineer. It is distinguished from the usual consultation only by the fact that the user becomes a knowledge engineer by editing the knowledge base, setting the cache, and tracing the operation of rule invocation during the consultation in order to debug and expand the knowledge base.

uninstantiated
: Means "not instantiated". See "instantiated".

value
: A set of expressions associated with every expression in the knowledge base. Once an expression is concluded to have a particular value during a consultation, the value cannot be unbound from the expression unless the expression includes a logical variable. Values are stored in cache and can be set or reset by the knowledge engineer during test consultations.

variable
: See "logical variable" and "binding".

APPENDIX II

Top Level Commands

```
? - adda NAME:KBENTRY
      Adds named entry to the front of KB, deleting any
      entry with NAME.

? - adda KBENTRY
      Adds entry to the front of KB and generates NAME.
```

? - addz NAME:KBENTRY
    Adds names to entry to end of KB, deleting any
    entry with NAME.
? - addz KBENTRY
    Adds entry to end of KB and generates NAME.
? - add NAME:KBENTRY
    Identical to addz NAME:KBENTRY
? - add KBENTRY
    Identical to addz KBENTRY
? - find EXPRESSION
    Finds a value for EXPRESSION and prints it.
? - go
    Clears cache and begins consultation
? - infix OP
    Sets "OP" as an infix operator for an "atom bond"
    thereby declaring that any number of spaces and
    OP between two of what otherwise would be
    individual atoms are ignored during knowledge
    base interpretation.
? - list
    Displays the entire knowledge base.
? - list NAME
    Displays the named knowledge base entry.
? - list EXPRESSION
    Displays all KB entries that can conclude
    EXPRESSION.
? - EXPRESSION = VALUE
    Displays KB entries that conclude EXPRESSION =
    VALUE.
? - load FILE
    Clears knowledge base and loads specified KB
    file.
? - load [FILE, ...].
    Clears knowledge base and loads specified files.
? - prefix OP
    Sets "OP" as a prefix operator for an "atom bond"
    thereby declaring that OP followed by spaces
    before an atom will be ignored during knowledge
    base interpretation.
? - postfix OP
    Sets "OP" as a postfix operator for an "atom
    bond" thereby declaring that OP and any number of
    spaces after an atom will be ignored during
    knowledge base interpretation.
? - remove NAME
    Removes specified entry from KB.

```
? - reset
    Clears cache, KB remains intact.

? - seek EXPRESSION
    Finds a value for EXPRESSION but does not print
    it.

? - show
    Displays all expressions currently assigned
    values.

? - show NAME
    Displays the named knowledge base entry.

? - show EXPRESSION
    Displays current values for EXPRESSION.

? - track
    Track everything

? - track EXPRESSION
    Tracks EXPRESSION.

? - tracked
    Prints a list of things currently being tracked.

? - untrack
    Disables tracking

? - untrack EXPRESSION
    Disables tracking on EXPRESSION.
```

APPENDIX III
VALID USER RESPONSES TO QUESTIONS DURING A CONSULTATION (1) In addition to providing answers to a question, you may also enter the following BEST commands:

| help.         | show           | track SOMETHING |
| list.         | show something | untrack         |
| list SOMETHING| track          | why             |
| ? - A PROLOG  | tracked        |                 |
| COMMAND       |                |                 |

(2) You may answer any question by typing unknown.

(3) BEST will accept an abbreviated response if the levalvals for the expression in question is a list of atoms and you have typed enough of the response to make it unique.

(4) You may supply certainty factors with your response, i.e.
>> red cf 60.

If no cf is provided, certainty (100) is assumed.

(5) You may give more than one value and cf: What color of wine do you generally prefer?
>> red of 80, white of 60.

APPENDIX IV
Reserved Propositions goal = L
    Defines single top-level goals (expression or list of expressions).
multivalued(E)
    Declares E as a multivalued expression.
initialdata = L
    Declares list of expressions sought before goal.
question(E) = S
    Display S when asking user for a value for E.
legalvals(E) = integer
    User must respond to prompt with an integer.
legalvals(E) = integer(L, H)
    User's response must be an integer, $>=L$, $=<H$.
legalvals(E) = [V, . . .]
    Specifies list of legal responses for E.
legalvals(E) = real
    User must respond to prompt with a floating number.
legalvals(E) = real(L, H)
    User's response must be a floating number, $>=L$, $=<H$.
legalvals(E) = number
    User must respond to prompt with a number (real or integer).
legalvals(E) = number(L, H)
    User's response must be $>=L$ and $=<H$.

APPENDIX V

Built-In Propositions

| -Atom Bonds- | -Arithmetic Propositions- | | | |
|---|---|---|---|---|
| prefix OP. | X + Y = V | X − Y = V | X * Y = V | X/Y = V |
| infix OP | X > Y | X > = Y | X < Y | X = < Y |
| postfix OP | sqrt(X) = Y | | | |

| -Display control- | -Propositions about Attributes- | | |
|---|---|---|---|
| color on. | X is known | X is unknown | X is sought |
| colors off. | X is definite | X definitely is V | X is unique |
| display(L) | | | |
| display (COLOR.L) | | | |

| | -Knowledgebase Access Propositions- |
|---|---|
| mostlikely(X) = V | Returns value of X with highest cf |
| mostlikelycf(X) = N | Returns most positive cf for X |
| listof(E) = L | Returns list of values for E, regardless of cf |
| listof(E, N) = L | Returns list of values for E, with cf > = N |
| inverse(VALUE) | Notes inverse(VALUE) = EXPRESSION for each EXPRESSION |

APPENDIX VI

Operators and Reserved Words Unavailable For Use As Atoms add
   Top level command adding entry to end of knowledge base
adda
   Top level command adding entry to beginning of knowledge base
addz
   Top level command adding entry to end of knowledge base
and
   Logical infix operator
because
   Reserved for explanation facility
cf
   Prefix operator to certainty factor of fact or rule
colors
   Built-in proposition to turn on or off display colors
concludes
   Reserved for internal operation
display
   Built-in proposition to set color of display
find
   Top level command finding and printing the value for a desired expression
goal
   Reserved proposition defining top-level goal
if
   Prefix operator to premise of rule
infix
   Reserved for top level command declaring "atom bonding" infix operations
initialdata
   Reserved proposition declaring a list of expressions sought before goal
invoke
   Reserved for internal subroutine name
legalvals
   Reserved proposition declaring legal values for an expression used for checking user response to prompt
list
   Top level command displays the entire knowledge base
load
   Top level command clears the knowledge base and loads a specified knowledge base file
mod
   Prefix arithmetic operator designating integer remainder of division
multivalued
   Reserved proposition declaring an expression as multi-valued
notrace
   Reserved for internal use
nospy
   Reserved for internal use
or
   Logical infix operator
postfix
   Reserved for top level command declaring "atom bonding" postfix operator
prefix
   Reserved for top level command declaring "atom bonding" prefix operator
prolog
   Prefix operator invoking the prolog interpreter to execute Prolog statements
refersto
   Reserved for internal use
remove
   Top level command removes specified entry from knowledge base
seek
   Top level command finds a value for a specified expression but does not print it
show
   Top level command displays all expressions currently assigned values
spy
   Reserved for internal use
sqrt
   Square root arithmetic proposition
then
   Prefix operator to conclusion of rule
trace
   Reserved for internal use
track
   Top level command tracks things
tracked
   Top level command prepares a list of things currently being tracked
untrack
   Top level command disables tracking
uses
   Reserved for internal use
"="
   Infix operator declaring that the expression to the right of the operator is to be included in the value of the expression on the left
"−"
   Arithmetic "minus" operator unless it appears as a character in a phrase. If it appears as a character in a phrase it is treated as any other alphabetic character, and thus is a kind of infix operator binding parts of atoms into a single atom "/*"
  Left delimiter of a comment
"*/"
  Right delimiter of a comment
":"
  Right delimiter or postfix operator defining a label
"_"
  Space or blank delimits atoms and variables. Cannot be used between functor and argument list
"."
  Period delimits knowledge base entries
"+ -*/ < > ="
  Set of arithmetic operators
"]"
  Prefix delimiter of a list except function argument list
"["
  Postfix delimiter of a list except function argument list
","
  Infix delimiter of list
"("
  Prefix delimiter of a function argument list
")"
  Postfix delimiter of a function argument list
"|"
  Prolog infix list operator dividing a list into the first element of the original list and a list containing the remaining elements of the original list

APPENDIX VII

The "Wine Advisor" Knowledge Base

```
/*
WINE
This knowledge base is for pedagogical purposes only,
it should not be considered 'expert'.
*/
goal = [wine].
multivalued(wine).
multivalued(feature).
/*
It is reasonable to be definite that there is more
than one wine and more than one feature.
*/
question(preferred-body) =
'Do you generally prefer light, medium or
full bodied wines?'
legalvals(preferred-body) =
[light, medium, full].
question(preferred-sweetness) =
'Do you generally prefer dry, medium or sweet wines?'.
legalvals(preferred-sweetness) =
[dry, medium, sweet].
question(preferred-color) =
'Do you generally prefer red or white wines?'
legalvals(preferred-color) =
[red, white].
question(tastiness) =
'Is the flavor of the meal delicate, average or strong?'.
legalvals(tastiness) =
[delicate, average, strong].
question(has-sauce) =
'Does the meal have a sauce on it?'.
legalvals(has-sauce) =
[yes, no].
question(sauce) =
'Is the sauce for the meal spicy, sweet, cream or tomato?'.
legalvals(sauce) =
[spicy, sweet, cream, tomato].
question(main-component) =
'Is the main component of the meal meat, fish or poultry?'.
legalvals(main-component) =
[meat, fish, poultry].
question(has-veal) =
'Does the meal have veal in it?'.
```

```
legalvals(has-veal) =
[yes, no].
question(has-turkey) =
'Does the meal have turkey in it?'.
legalvals(has-turkey) =
[yes, no].
rule1: if has-sauce = yes
and sauce = spicy
then best-body = full.
rule2: if has-sauce = yes
and sauce = spicy
then feature = spiciness.
/*
There could be a rule that assigns 'strong'to tastiness
if has-sauce = spicy,
then there would be no need to ask about body.
*/
/*
legend for the certainty factors:
80 - almost certain
60 - probably
30 - slight evidence
*/
rule3: if tastiness = delicate
then best-body = light cf 80.
rule4: if tastiness = average
then best-body = light cf 30
and best-body = medium cf 60
and best-body = full cf 30.
rule5: if tastiness = strong
then best-body = medium cf 40
and best-body = full cf 80.
rule6: if has-sauce = yes
and sauce = cream
then best-body = medium of 40
and best-body = full of 60.
rule7: if best-body = light
then recommended-body = light.
/*
If the best-body is definite, then the recommended-body is definite.
*/
rule8: if best-body = medium
then recommended-body = medium.
rule9: if best-body = full
then recommended-body = full.
/*
Rules 11 through 19 may not be used if best-body is definite.
These rules provide supporting evidence for recommended-body
based on the user's answers.
*/
rule11: if preferred-body = light
and best-body = light
then recommended-body = light cf 20.
rule12: if preferred-body = medium
and best-body = medium
then recommended-body = medium cf 20.
rule13: if preferred-body = full
and best-body = full
then recommended-body = full cf 20.
rule14: if preferred-body = light
and best-body = full
then recommended-body = medium.
rule15: if preferred-body = full
and best-body = light
then recommended-body = medium.
rule16: if preferred-body = light
and best-body is unknown
then recommended-body = light.
rule17: if preferred-body = medium
and best-body is unknown
then recommended-body = medium.
rule18: if preferred-body = full
and best-body is unknown
then recommended-body = full.
rule19: if best-body is unknown
then recommended-body = medium.
rule20: if main-component = meat
and has-veal = no
then best-color = red cf 90.
rule21: if main-component = poultry
and has-turkey = no
then best-color = white cf 90
```

```
and best-color = red cf 30.
rulle22: if main-component = fish
then best-color = white.
/*
Rules 22 and 23 are the only rules that conclude
best-color with complete certainty.
*/
rule23: if not(main-component = fish)
and has-sauce = yes
and sauce = tomato
then best-color = red.
rule24: if main-component = poultry
and has-turkey = yes
then best-color = red cf 80
and best-color = white cf 50.
rule25: if main-component is unknown
and has-sauce = yes
and sauce = cream
then best-color = white cf 40.
rule26: if best-color = red
then recommended-color = red.
rule27: if best-color = white
then recommended-color = white.
rule28: if preferred-color = red
and best-color = red
then recommended-color = red cf 20.
/*
Compare rules 25 and 28. If there is a match between
preferred-color and best-color then the cf of recommended-color
will be increased. If there is no match between preferred-color
and the best-color then the preference is ignored.
*/
rule29: if preferred-color = white
and best-color = white
then recommended-color = white cf 20.
rule30: if preferred-color = red
and best-color is unknown
then recommended-color = red.
rule31: if preferred-color = white
and best-color is unknown
then recommended-color = white.
rule32: if preferred-color is unknown
then recommended-color = red cf 50
and recommended-color = white cf 50.
/*
Rule 33 deduces best-sweetness.
*/
rule33: if has-sauce = yes
and sauce = sweet
then best-sweetness = sweet cf 90
and best-sweetness = medium cf 40.
/*
Rules 34 through 45 combine best-sweetness and
recommended-sweetness.
*/
rule34: if best-sweetness = dry
then recommended-sweetness = dry.
rule35: if best-sweetness = medium
then recommended-sweetness = medium
rule36: if best-sweetness = sweet
then recommended-sweetness = sweet.
rule 37: if best-sweetness is unknown
and preferred-sweetness is unknown
then recommended-sweetness = medium.
rule38: if best-sweetness = dry
and preferred-sweetness = dry
then recommended-sweetness = dry cf 20.
rule39: if best-sweetness = medium
and preferred-sweetness = medium
then recommended-sweetness = medium cf 20.
rule40: if best-sweetness = sweet
and preferred-sweetness = sweet
then recommended-sweetness = sweet cf 20.
rule41: if preferred-sweetness = dry
and best-sweetness is unknown
then recommended-sweetness = dry.
rule42: if preferred-sweetness = medium
and best-sweetness is unknown
then recommended-sweetness = medium.
rule43: if preferred-sweetness = sweet
and best-sweetness is unknown
then recommended-sweetness = sweet.
rule 44: if preferred-sweetness = dry
and best-sweetness = sweet
then recommended-sweetness = medium.
rule45: if preferred-sweetness = sweet
and best-sweetness = dry
then recommended-sweetness = medium.
/*
Rule 46 through 57 conclude wine.
*/
rule46: if recommended-color = red
and recommended-body = medium
and recommended-sweetness = medium
or recommended-sweetness = sweet
then wine = gamay.
rule47: if recommended-color = white
and recommended-body = light
and recommended-sweetness = dry
then wine = chablis.
rule48: if recommended-color = white
and recommended-body = medium
and recommended-sweetness = dry
then wine = sauvignon-blanc.
rule49: if recommended-color = white
and recommended-body = medium
or recommended-body = full
and recommended-sweetness = dry
or recommended-sweetness = medium
then wine = chardonnay.
rule50: if recommended-color = white
and recommended-body = light
and recommended-sweetness = dry
or recommended-sweetness = medium
then wine = soave.
rule51: if recommended-color = white
and recommended-body = light
or recommended-body = medium
and recommended-sweetness = medium
or recommended-sweetness = sweet
then wine = riesling.
rule52: if recommended-color = white
and recommended-body = full
and feature = spiciness
then wine = geverztraminer.
rule53: if recommended-color = white
and recommended-body = light
and recommended-sweetness = medium
or recommended-sweetness = sweet
then wine = chenin-blanc.
rule54: if recommended-color = red
and recommended-body = light
then wine = valpolicella.
rule55: if recommended-color = red
and (recommended-body = full
or recommended-sweetness = dry
or recommended-sweetness = medium)
then wine = zinfandel.
rule56: if recommended-color = red
and (recommended-body = full
or recommended-body = medium)
and recommended-sweetness = dry
then wine = cabernet-sauvignon.
rule57: if recommended-color = red
and recommended-body = medium
and recommended-sweetness = medium
then wine = pinot-noir.
rule58: if recommended-color = red
and recommended-body = full
then wine = burgundy.
```

APPENDIX VIII

"WINE ADVISOR" CONSULTATION

?- <u>go</u>.

Is the main component of the meal meat, fish or poultry?

>> <u>poultry</u>.

Does the meal have turkey in it?

>> <u>y</u>.

Does the meal have a sauce on it?

>> <u>y</u>.

Is the sauce for the meal spicy, sweet, cream, or tomato?

>><u>sweet</u>.

Do you generally prefer red or white wines?

>> <u>white</u>.

Is the flavor of the meal delicate, average or strong?

>> <u>average</u>.

Do you generally prefer light, medium, or full bodied wines?

>> <u>medium</u>.

Do you generally prefer dry, medium, or sweet wines?

>> <u>medium</u>.

BEST has reached the following conclusions about wine:
```
    wine=riesling (87%) because rule51
    wine=gamay (79%) because rule46
    wine=chardonnay (60%) because rule49
    wine=chenin-blanc (51%) because rule53
    wine=pinot-noir (44%) because rule56
    wine=burgundy (30%) because rule57
    wine=zinfandel (30%) because rule55
    wine=cabernet-sauvignon (30%) because rule55
    wine=valpolicella (30%) because rule54
    wine=soave (30%) because rule50
```

?-

APPENDIX IX

EXPLANATION FACILITY DURING A "WINE ADVISOR" CONSULTATION

?- go.

Is the main component of the meal meat, fish, or poultry?

\>\> poultry and meat.

Does the meal have veal in it?

\>\> no.

Does the meal have turkey in it?

\>\> why.

Your answer to this quesstion will help determine if the following rule is applicable in this consultation:

rule21:
        if:   main-component=poultry and
               has-turkey=no
        then best-color=white cf 90 and
              best-color=red cf 30.

The following rules are also under consideration:

rule26
        rule46

Does the meal have turkey in it?

\>\> yes.

Does the meal have a sauce on it?

\>\> yes.

Is the sauce for the meal spicy, sweet, cream or tomato?

\>\> why.

Your answer to this question will help determine
   if the following rule is applicable in this
   consultation:

rule23:
   if   not main-component=fish and
        has-sauce=yes and
        sauce=tomato
   then best-color=red.

The following rules are also under consideration:

rule26
   rule46

Is the sauce for the meal spicy, sweet, cream or tomato?

>> spicy.

Do you generally prefer dry, medium or sweet wines?

>> why.

Your answer to this question will help determine
      if the following rule is applicable in this
      consultation:

rule37:
      if   best-sweetness is unknown and
           preferred-sweetness is unknown
      then recommended-sweetness=medium.

The following rules are also under consideration:

rule49

Do you generally prefer dry, medium or sweet wines?

>> medium.

BEST has reached the following conclusions about wine:

wine=burgundy (98%) because rule57
   wine=zinfandel (98%) because rule55
   wine=cabernet-sauvignon (98%) because rule55
   wine=geverztraminer (54%) because rule52
   wine=chardonnay (54%) because rule49

APPENDIX X

```
/* Factorial Calculator */
goal = [factorial].
question(number) =
'For what number do you want the factorial?'.
legalvals(number) = integer.
fact1: fact−1 = 1
rule1: if N−1 = L and N * fact−L = M
then fact−N = M.
rule2: if number = N and fact−N = F
then factorial = F.
```

APPENDIX XI

PROLOG VERSION OF BEST

```
%       The following statements define the grammar
%   of the KB language
%       and of items in the cache.

:- op(975, xfy, :),
   op(950, fx,  if),
   op(949, xfy, then),
   op(948, xfy, because),
   op(800, xfy, and),
   op(750, xfy, or),
   op(725, xfy, cf).

%       The following routine asks a question of the
%   user to determine the
%       value of some expression.  The user may
%   respond with a request for
%       explanation or justification as well as with
%   an answer ask(EXPRESSION, QUESTION) :-
    write(QUESTION),
    nl,
    read(RESPONSE),
    respondto(EXPRESSION, QUESTION, RESPONSE).

%       The following routine runs a consultation go :-
    reset,
    kbentry(LABEL:goal = EXPRESSION),
    seek(EXPRESSION),
    show(EXPRESSION).

%       The following routine combines the reasons
%   why some fact is
%       believed true.  It prevents reasons of the
%   form "kb12 and kb12".

labelcombine(LABEL, LABEL, LABEL) :-
    !.
```

```
labelcombine(LABEL1, LABEL1 and LABEL2, LABEL1 and
LABEL2) :-
    !.
labelcombine(LABEL1, LABEL2, LABEL1 and LABEL2).

%       The following routine prints out rules and
%   facts from
%       the knowledge base list(LABEL) :-
    kbentry(LABEL:ANY),
    write(LABEL:ANY),
    nl.

%       The following program clears the KB and reads
%   in a fresh KB from disc.

load(FILE) :-
    retractall(kbentry(ANY)),
    see(FILE),
    repeat,
    read(KBENTRY),
    (KBENTRY = end_of_file;
assert(kbentry(KBENTRY))),
    KBENTRY = end_of_file,
    !,
    seen.

%       The following routine returns the minimum of
%   two numbers minimum(N1, N2, N1) :-
    N1 =< N2,
    !.
minimum(N1, N2, N2).

%       The following routine tests if an expresion
%   is multivalued multivalued(EXPRESSION) :-
    kbentry(LABEL: multivalued(EXPRESSION)).

%       The following routine tests if a Prolog goal
%   is NOT true.

not(GOAL) :-
    \+GOAL.

%       The following routine adds an item to the
%   cache and performs
%       certain housekeeping, such as:
%
%       (a) Ignoring unknown as a value
%       (b) Allowing users to supply multiple answers
%       (c) Allowing users to qualify answers with a
```

```
%   CF
%       (d) Combining several pieces of evidence for
%   the same value note(EXPRESSION = unknown cf CF because LABEL) :-
    !.

note(EXPRESSION = (VALUE1 and VALUE2) cf CF because
LABEL) :-
    !,
    note(EXPRESSION = VALUE1 cf CF because LABEL),
    note(EXPRESSION = VALUE2 cf CF because LABEL).

note(EXPRESSION = (VALUE cf CF) cf 100 because LABEL)
:-
    !,
    note(EXPRESSION = VALUE cf CF because LABEL).

note(EXPRESSION = VALUE cf CF1 because LABEL1) :-
    retract(cached(EXPRESSION = VALUE cf CF2 because
LABEL2)),
    !,
    CF3 is (100 * CF1 + 100 * CF2 - CF1 * CF2) / 100,
    labelcombine(LABEL1, LABEL2, LABEL3),
    assert(cached(EXPRESSION = VALUE cf CF3 because
LABEL3)).

note(EXPRESSION = VALUE cf CF because LABEL) :-
    assert(cached(EXPRESSION = VALUE cf CF because
LABEL)).

%       The following routine does the processing
%   necessary after an
%       expression has been sought.  In particular,
%   it invokes any
%       ''conclusion monitoring'' goals specified by
%   the KE.

processwhenfound(EXPRESSION) :-
    kbentry(LABEL:whenfound(EXPRESSION = VALUE) =
PROPOSITION),
    cached(EXPRESSION = VALUE cf CF because LABEL2),
    CF >= 20,
    test(PROPOSITION, CF2),
    fail.
processwhenfound(EXPRESSION).

%       The following routine clears the cache.

reset :-
    retractall(cached(EXPRESSION1 = VALUE1 cf CF1
because LABEL1)),
    retractall(sought(EXPESSION2)).

%       The following routine processes a users
%   answer to a question
```

```
%       and in particular gives explanations of why a
%   question is being
%       asked.

respondto(EXPRESSION, QUESTION, why) :-
    subgoal_of(try(EXPRESSION2, LABEL:if PREMISE then
CONCLUSION)),
    list(LABEL),
    !,
    ask(EXPRESSION, QUESTION).

respondto(EXPRESSION, QUESTION, list(LABEL)) :-
    list(LABEL),
    !,
    ask(EXPRESSION, QUESTION).

respondto(EXPRESSION , QUESTION, show(EXPRESSION2))
:-
    show(EXPRESSION2),
    !,
    ask(EXPRESSION, QUESTION).

respondto(EXPRESSION, QUESTION, ANSWER) :-
    note(EXPRESSION = ANSWER cf 100 because 'you said
so'').

%       The following routine clears all matching
%   data from the Prolog
%       database.

retractall(DATUM) :-
        retract(DATUM),
        fail.
retractall(DATUM).

%       The following routine scans all the items in
%   the KB trying those
%       relevant to a givene expression.  if there
%   are no KB items, then the
%       routine makes up a question.
% scankb(EXPRESSION) :-
    assert(makequestion(EXPRESSION)),
    kbentry(KBENTRY),
    try(EXPRESSION, KBENTRY),
    !.
scankb(EXPRESSION) :-
    retract(makequestion(EXPRESSION)),
    try(EXPRESSION,
        auto: question(EXPRESSION) = 'What is the
value of:'(EXPRESSION)),
    !.
```

```
scankb(EXPRESSION).

%       The following routine finds the value of some
%   expression and stores
%       it in the cache.

seek(EXPRESSION) :-
    sought(EXPRESSION),
    !.
seek(EXPRESSION) :-
    assert(sought(EXPRESSION)),
    scankb(EXPRESSION),
    processwhenfound(EXPRESSION),
    !.
seek(EXPRESSION) :-
    processwhenfound(EXPRESSION),
    !.

%       The following routine shows the value
%   determined for some
%       expression.

show(EXPRESSION) :-
    not(cached(EXPRESSION = VALUE cf CF because
LABEL)),
    !,
    write('No value cached for '(EXPRESSION)),
    nl.
show(EXPRESSION) :-
    cached(EXPRESSION = VALUE cf CF because LABEL),
    write(EXPRESSION = VALUE cf CF because LABEL),
    nl,
    fail.
show(EXPRESSION).

%       The following routine determines if an
%   expression is
%       singlevalued.

singlevalued(EXPRESSION) :-
    not(multivalued(EXPRESSION)).

%       The following routine succeeds if the given
%   expression is
%       singlevalued and definite.  In this event, it
%   also clears the
%       cache of those values which have only partial
%   evidence.

svcutoff(EXPRESSION) :-
    singlevalued(EXPRESSION),
    cached(EXPRESSION = VALUE1 cf 100 because
```

LABEL1),
    retractall(cached(EXPRESSION = VALUE2 cf CF2 because LABEL2)),
    assert(cached(EXPRESSION = VALUE1 cf 100 because LABEL1)).

%       The following routine determines all the ways
%   in which some
%       proposition might be true and returns the CF
%   of each way sequentially
%       on backtracking.

test(PROPOSITION1 and PROPOSITION2, CF3) :-
    test(PROPOSITION1, CF1),
    test(PROPOSITION2, CF2),
    minimum(CF1, CF2, CF3).

test(PROPOSITION1 or PROPOSITION2, CF) :-
    test(PROPOSITION1, CF).

test(PROPOSITION1 or PROPOSITION2, CF) :-
    test(PROPOSITION2, CF).

test(not(PROPOSITION), 100) :-
    not(test(PROPOSITION, CF)).

test(EXPRESSION is unknown, 100) :-
    seek(EXPRESSION),
    unknown(EXPRESSION).

test(display(TEXT), 100) :-
    write(TEXT),
    nl.

test(EXPRESSION = VALUE, CF) :-
    seek(EXPRESSION),
    cached(EXPRESSION = VALUE cf CF because LABEL),
    CF >= 20.

try(EXPRESSION, LABEL:EXPRESSION = VALUE cf CF) :-
    retractall(makequestion(EXPRESSION)),
    note(EXPRESSION = VALUE cf CF because LABEL),
    svcutoff(EXPRESSION).

%       The following routine trys applying some KB
%   item towards
%       finding a value for some expression.
%
%       If the expression should be regarded as fully
%   sought because either
%               (a) singlevalued and definite
%               (b) presupposition failure
%       then this routine will succeed, so

```
%    terminating SCANKB.
%        In fact, it almost always fails.  This forces
%    iteration in SCANKB
%        from which it is invoked.
%
%        Notice the way that the failure of the
%    SVCUTOFF will cause
%        iteration within TEST which is invoked as
%    subroutine from TRY.

try(EXPRESSION, LABEL:if PREMISE then EXPRESSION =
VALUE cf CF1) :-
     retractall(makequestion(EXPRESSION)),
     test(PREMISE, CF2),
     CF3 is (CF1 * CF2) / 100,
     note(EXPRESSION = VALUE cf CF3 because LABEL),
     svcutoff(EXPRESSION).

%        Questions are NOT asked if the expression is
%    already known
%        and is singlevalued.

try(EXPRESSION, LABEL:question(EXPRESSION) =
QUESTION) :-
     (multivalued(EXPRESSION); unknown(EXPRESSION)),
     !,
     retractall(makequestion(EXPRESSION)),
     ask(EXPRESSION, QUESTION),
     svcutoff(EXPRESSION).

%        Presuppositions must come out true or else
%    TRY will succeed and
%        cause SCANKB to terminate.

try(EXPRESSION, LABEL:presupposition(EXPRESSION) =
PROPOSITION) :-
     not(test(PROPOSITION, CF)).

%        The following routine tests if an expression
%    is unknown.

unknown(EXPRESSION) :-
     not((cached(EXPRESSION = VALUE cf CF because
LABEL), CF >= 20)),
     !.
```

What is claimed is:

1. A knowledge engineering tool comprising a computer having memory for storing a knowledge base, means for interpreting the knowledge base to run an advisory consultation to determine the value of any selected goal expression requested by the user and the value of any subsidiary goal expression implicitly required to determine the value of said selected goal expression,
  wherein said knowledge base includes
    facts expressed as expressions equivalenced to corresponding values,
    rules including premises having logical operations and corresponding conclusions concluding at least one value for a selected expression,
    meta-facts equivalent in form to facts but prescribing the manner in which facts and rules should be used, and
    declarations defining whether certain of said expressions are single-valued or multiple-valued, and
  wherein said means for interpreting said knowledge base includes means for determining the value of any selected goal expression, means for searching the knowledge base for occurrences of the selected expression, means for invoking and chaining said rules concluding a value for the selected goal expression, means for evaluating said logical operations in the premises of the invoked rules, means for terminating the searching of the knowledge base for a single-valued expression when a substantially certain value is found, and for a multiple-valued expression when all values for the expression are determined, and means for conveying to the user said value of said goal expression.

2. A knowledge engineering tool as set forth in claim 1 wherein said rules in said knowledge base include recursive rules and rules having universally quantified variables, and said means for interpreting said knowledge base includes means for instantiating and de-instantiating the universally quantified variables in said rules.

3. A knowledge engineering tool as set forth in claim 1 which includes means for augmenting and editing the knowledge base, and means for generating a record of said consultation including an ordered list of the rules invoked during a test consultation.

4. A knowledge engineering tool as set forth in claim 1 wherein said advisory consultation is interactive, said knowledge base includes declarations defining questions to be asked to determine the values of certain of said expressions, and said means for interpreting said knowledge base includes means for asking the user said questions when the values of their corresponding expressions are not known with a predetermined certainty, and means for receiving from the user values for said expressions.

5. A knowledge engineering tool as set forth in claim 4 wherein said means for interpreting said knowledge base includes means for generating an appropriate question when the value of a certain expression is not known and no explicit question is defined by a declaration in the knowledge base.

6. A knowledge engineering tool as set forth in claim 4 wherein said means, for interpreting said knowledge base includes means for explaining to the user why the user is asked said questions to determine the values of certain of said expressions.

7. A knowledge engineering tool as set forth in claim 4 wherein said knowledge base includes declarations defining legal values of said expressions whose values are to be determined by asking said questions, and said means for interpreting said knowledge base includes means for checking said values received from the user against said legal values.

8. A knowledge engineering tool as set forth in claim 1 wherein said means for interpreting said knowledge base includes means for determining the value of at least one predetermined goal expression, and certain of said meta-facts specify predetermined goal expressions.

9. A knowledge engineering tool as set forth in claim 1 wherein said rules include recursive rules.

10. A knowledge engineering tool as set forth in claim 1 wherein said knowledge base includes built-in predicates for determining the degree of certainty with which the value of a predetermined expression has been determined.

11. A knowledge engineering tool as set forth in claim 1 wherein said means for interpreting said knowledge base includes means for determining the certainty factor for the value of any selected goal expression, means for updating said certainty factor by combining certainty factors from multiple sources, and means for conveying said certainty factor to the user.

12. A knowledge engineering tool as set forth in claim 11 wherein said facts and rules in said knowledge base include certainty factors encoding uncertain as well as certain knowledge, and said means for interpreting said knowledge base includes means for selecting certainty factors for the determined values based on the certainty factors of said rules and the certainty factors of said premises.

13. A knowledge engineering tool as set forth in claim 1 which includes means for explaining to the user how a determined value for a goal expression was determined.

14. A knowledge engineering tool as set forth in claim 1 wherein said knowledge base includes propositions including arithmetic operations, and said means for interpreting said knowledge base includes means for evaluating said propositions.

15. A knowledge engineering tool comprising a computer having memory for storing a knowledge base and memory for storing predetermined instructions including means to augment and edit the knowledge base, and means for interpreting the knowledge base to run an interactive consultation with the user to determine the value of at least one predetermined goal expression, wherein said knowledge base includes facts expressed as expressions equivalenced to corresponding values, rules including premises having logical operations and corresponding conclusions concluding at least one value for said goal expression, said rules including recursive rules and rules having universally quantified variables, propositions including arithmetic operations, declarations defining whether selected expressions are single valued or multiple-valued, declarations defining questions to be asked to determine the values of selected expressions, and declarations defining legal values of selected expressions, and wherein said means for interpreting the knowledge base includes means for determining the value of said goal expression including means for searching the knowledge base for occurrences of the goal expression, means for invoking and chaining said rules to conclude a value for said goal expression, means for evaluating the logical operations in the premises of the invoked rules, means for evaluating said propositions, means for terminating the searching of the knowledge base for a single-valued expression when a certain value is found and for a multiple-valued expression when all values for the expression are determined, means for instantiating and de-instantiating the universally quantified variables in said rules, means for asking the user said questions to determine the values of their corresponding expressions, means for receiving from the user and checking values of said corresponding expressions against the corresponding declared legal values, and means for explaining to the user why the user is asked for the values of said corresponding expressions, means for conveying to the user said value of said goal expression, means for explaining to the user how said value of said goal expression was determined, and means for generating a record of said consultation including a list of the rules invoked during a test consultation.

16. A knowledge engineering tool comprising a computer having memory for storing a knowledge base and memory for storing predetermined instructions including means to augment and edit the knowledge base, and means for interpreting the knowledge base to run an interactive consultation with the user to determine the value of at least one predetermined goal expression, wherein said knowledge base includes facts expressed as expressions equivalenced to corresponding values, rules including premises having logical operations and corresponding conclusions concluding at least one value for said goal expression, said rules including recursive rules and rules having universally quantified variables, certainty factors associated with said facts and rules for encoding uncertain as well as certain knowledge, propositions including arithmetic operations, propositions responsive to whether a value of a predetermined expression has been determined with a predetermined degree of certainty, and declarations defining whether selected expressions are single-valued or multiple-valued, and wherein said means for interpreting the knowledge base includes means for determining the value of said goal expression including means for searching the knowledge base for occurrences of the goal expression, means for invoking and chaining said rules to conclude a value for said goal expression, means for evaluating the logical operations of the premises of the invoked rules and selecting certainty factors for the concluded values based on the certainty factors of the rules and the certainty factors of the premises, means for updating the certainty factor of a value of an expression by combining certainty factors, means for evaluating said propositions, means for terminating the searching of the knowledge base for a single-valued expression when a certain value is found and for a multiple-valued expression when all values for the expression are determined, and means for instantiating and de-instantiating the universally quantified variables in said rules, and means for conveying to the user said value of said goal expression and its certainty factor.

17. A knowledge engineering tool comprising a computer having memory for storing a knowledge base and memory for storing predetermined instructions including means to augment and edit the knowledge base, and means for interpreting the knowledge base to run an interactive consultation with the user to determine the value of at least one predetermined goal expression, wherein said knowledge base includes facts expressed as expressions equivalenced to corresponding values, rules including premises having logical operations and corresponding conclusions concluding at least one value for said goal expression, said rules including recursive rules and rules having universally quantified variables, and declarations defining whether selected expressions are single-valued or multiple-valued, and wherein said means for interpreting the knowledge base includes means for determining the value of said goal expression including means for searching the knowledge base for occurrences of the goal expression, means for invoking and chaining said rules to conclude a value for said goal expression, means for evaluating the logical operations in the premises of the invoked rules, means for terminating the searching of the knowledge base for a single-valued expression when a certain value is found and for a multiple-valued expression when all values for the expression are determined, and means for instantiating and de-instantiating the universally quantified variables in said rules, and means for conveying to the user said value of said goal expression.

18. A knowledge engineering tool comprising a computer having memory for storing a knowledge base and memory for storing predetermined instructions including means to augment and edit the knowledge base, and means for interpreting the knowledge base to run an interactive consultation with the user to determine the value of at least one predetermined goal expression, wherein said knowledge base includes facts expressed as expressions equivalenced to corresponding values, rules including premises having logical operations and corresponding conclusions concluding at least one value for said goal expression, said rules including recursive rules and rules having universally quantified variables, certainty factors associated with said facts and rules for encoding uncertain as well as certain knowledge, propositions including arithmetic operations, propositions responsive to whether a value of a predetermined expression has been determined with a predetermined degree of certainty, declarations defining whether selected expressions are single-valued or multiple-valued, declarations defining questions to be asked to determine the values of selected expressions, and declarations defining legal values of selected expressions, and wherein said means for interpreting the knowledge base includes means for determining the value of said goal expression including means for searching the knowledge base for occurrences of the goal expression, means for invoking and chaining said rules to conclude a value for said goal expression, means for evaluating the logical operations of the premises of the invoked rules and selecting certainty factors for the concluded values based on the certainty factors of the rules and the certainty factors of the premises, means for updating the certainty factor of a value of an expression by combining certainty factors, means for evaluating said propositions, means for terminating the searching of the knowledge base for a single-valued expression when a certain value is found and for a multiple-valued expression when all values for the expression are determined, means for instantiating and de-instantiating the universally quantified variables in said rules, means for asking the user said questions when the values of their corresponding expressions are not known with a predetermined certainty, means for receiving from the user and checking values of said corresponding expressions against the corresponding declared legal values, and means for explaining to the user why the user is asked for the values of said corresponding expressions, means for conveying to the user said value of said goal expression and its certainty factor, means for explaining to the user how said value of said goal expression was determined, and means for generating a record of said consultation including a list of the rules invoked during a test consultation.

19. The knowledge engineering tool as claimed in claim 18, wherein the sequence in which rules concluding said expressions are invoked is determined by the order in which said rules appear in said knowledge base.

20. The knowledge engineering tool as claimed in claim 19, wherein said rules concluding values of said expressions for which said questions are defined are not invoked, when said rules appear after the respective questions for said expressions, until after said questions are asked when the respective values of said expressions are not known with a predetermined certainty.

21. The knowledge engineering tool as claimed in claim 18, wherein said memory of said computer includes a cache memory for sequentially recording said expressions, their corresponding values and certainty factors, whenever the values for said expressions are determined by said means for determining.

22. The knowledge engineering tool as claimed in claim 21, wherein at least some of said facts and rules include labels identifying particular ones of said facts and rules, and wherein said cache stores the labels of the corresponding facts and rules used in determining the corresponding values of said expressions.

23. The knowledge engineering tool as claimed in claim 18, wherein said propositions include user-defined propositions.

24. The knowledge engineering tool as claimed in claim 23, wherein said user defined propositions include PROLOG subroutines.

25. The knowledge engineering tool as claimed in claim 21, wherein the means for determining the value and said certainty factor of said goal expression include means for sequentially checking whether said expression includes one of said propositions for immediate execution; thereafter determining whether the expression has already been determined for obtaining its already determined value; and thereafter checking the knowledge base for the occurrence of said expression.

26. The knowledge engineer tool as claimed in claim 25, wherein the means for determining the value and said certainty factor of said goal expression further includes means for determining a value of unknown when said knowledge base has been checked for the occurrence of said expression and no value for said expression is determinable from said knowledge base so that said knowledge base is not searched twice for the value of said goal expression.

27. The knowledge engineering tool as claimed in claim 18, wherein said means for the user to augment and edit the knowledge base includes a disk memory device including a knowledge base disk file and a standard microcomputer text editor for editing the knowledge base disk file.

28. The knowledge engineering tool as claimed in claim 27, further comprising means for loading said knowledge base from said disk file; wherein said disk file includes comments and multiple blanks, and said means for loading includes means for deleting comments and multiple blanks.

29. A process of operating a computer having a memory to execute a knowledge base stored in the memory to run an advisory consultation about a predefined goal expression included in the knowledge base, said knowledge base comprising entries including facts expressed as expressions equivalenced to corresponding values, rules including premises having logical operations and corresponding conclusions concluding at least one value for a corresponding expression, said rules including recursive rules and rules having universally quantified variables, meta-facts equivalent in form to facts but prescribing the manner in which facts and rules should be used, and declarations defining whether certain of said expressions are single-valued or multiple-valued, said process comprising the steps of:

searching the knowledge base for occurrences of said goal expression, and determining the value of said goal expression by invoking said rules concluding a value for said goal expression, searching the knowledge base for entries concluding values for subsidiary goal expressions found in the premises of said invoked rules, invoking said rules concluding values for said subsidiary goal expressions including evaluating said logical operations in said premise of said rules and instantiating and de-instantiating said logical variables to said subsidiary goal expressions, chaining said rules concluding values for said subsidiary goal expressions with said rules concluding a value for said goal expression, terminating the searching of the knowledge base for a single-valued expression when a substantially certain value is found, and for a multiple-valued expression when all values for the expression are determined, and transmitting to the user said determined value for said goal expression along with an explanation of how said value was determined for said goal expression.

30. A process as set forth in claim 29 wherein the step of determining the value of said goal expression includes the recording of the rules invoked and concluding a value for said goal expression, and said explanation of how said value was determined for said goal expression includes a listing of the rules concluding said values.

31. A process as set forth in claim 29 wherein, said knowledge base includes declarations defining questions to be asked to determine the values of certain of said subsidiary goal expressions, and the step of determining the value of said goal expression includes the steps of asking the user said questions when the values of their corresponding subsidiary goal expressions are not known with a predetermined certainty when said questions are found in the knowledge base, and receiving from the user values for said expressions.

32. A process as set forth in claim 31, wherein the step of determining the value of said goal expression further comprises the step of generating and asking the user an appropriate question after the knowledge base is searched for any of said subsidiary goal expressions and respective values for said subsidiary goal expressions are not determined.

33. A process as set forth in claim 29, wherein the step of determining the value of said goal expression further includes the step of determining a value of unknown for any of said subsidiary goal expressions that are not determined after the knowledge base is searched for said subsidiary goal expressions so that said knowledge base is not searched twice for the value of said subsidiary goal expressions.

34. A knowledge system comprising a computer having memory for storing a knowledge base including expressions, and means for interpreting the knowledge base to determine the value of a selected one of said expressions, wherein said knowledge base includes a plurality of entries including facts expressed as expressions equivalenced to corresponding values, rules including premises having logical operations and corresponding conclusions concluding at least one value for respective expressions, said facts and rules including respective certainty factors for encoding certain as well as uncertain knowledge, and declarations defining questions to be asked of a user to determine the values of certain of said expressions, and wherein said means for interpreting said knowledge base to determine the value of selected expression includes means for sequentially searching the knowledge base to find occurrences of the selected expression, means for determining whether an occurrence of the selected expression is found in a fact equivalencing a value for the selected expression and thereupon determining the equivalenced value and certainty factor for said expression, means for determining whether an occurrence of the selected expression is found in a rule concluding a value for the selected expression and thereupon evaluating the premise of the rule by evaluating the logical operations in the premise and recursively searching the knowledge base to determine values for expressions that are arguments of said logical operations, and upon evaluation of the premise of the rule conditionally concluding a value and certainty factor for the selected expression responsive to the respective certainty factor of the rule and the evaluation of the premise, and means for determining whether an occurrence of the selected expression is found in a declaration defining a question to be asked the user, and thereupon asking the user for a value and certainty factor for the selected expression.

35. The knowledge system as claimed in claim 34 wherein the memory includes a cache portion for storing the determined values and certainty factors for expressions, and wherein the means for determining the value of a selected expression includes means for first checking whether a value for the selected expression is already stored in the cache and when a value is already stored thereupon terminating the determination procedure.

36. The knowledge system as claimed in claim 35 wherein the cache includes a portion for storing the reason for concluding each value stored in the cache, and the means for determining the value of a selected expression includes means for storing a label along with each determined value stored in cache identifying the reason for concluding the value including identification of a respective rule concluding the value, identification of a respective fact equivalencing the value, and identification that the user was asked for the value.

37. The knowledge system as claimed in claim 34 wherein the knowledge base includes means for identifying whether an expression in the knowledge base is single-valued or multiple-valued, and means for determining the value of a selected expression includes means for terminating the searching of the knowledge base for single-valued expression when a substantially certain value is found, and for a multiple-valued expression when the entire knowledge base is searched.

38. The knowledge system as claimed in claim 34, wherein
said rules in said knowledge base include recursive rules and rules having universally quantified variables, and
wherein said means for determining the value of a selected expression includes means for instantiating and de-instantiating the universally quantified variables in said rules.

39. The knowledge system as claimed in claim 38, wherein said expressions in said knowledge base include functions, and said means for instantiating and de-instantiating the universally quantified variables in said rules includes means for instantiating function argument variables to respective function argument values.

40. The knowledge system as claimed in claim 34, wherein said knowledge base includes at least one built-in function responsive to the certainty factor of an argument expression, and said means for determining the value of a selected expression includes means for evaluating said built-in function.

* * * * *